(12) United States Patent
Nelson

(10) Patent No.: US 10,553,129 B2
(45) Date of Patent: Feb. 4, 2020

(54) SYSTEM AND METHOD FOR RECORDING, DOCUMENTING AND VISUALIZING GROUP CONVERSATIONS

(71) Applicant: David Nelson, Neskowin, OR (US)

(72) Inventor: David Nelson, Neskowin, OR (US)

(*) Notice: Subject to any disclaimer, the term of this patent is extended or adjusted under 35 U.S.C. 154(b) by 44 days.

(21) Appl. No.: 15/658,511

(22) Filed: Jul. 25, 2017

(65) Prior Publication Data

US 2018/0033332 A1 Feb. 1, 2018

Related U.S. Application Data

(60) Provisional application No. 62/367,428, filed on Jul. 27, 2016.

(51) Int. Cl.

| G09B 19/00 | (2006.01) |
|---|---|
| G06F 3/0481 | (2013.01) |
| G06F 3/16 | (2006.01) |
| G06F 3/0482 | (2013.01) |
| G09B 5/06 | (2006.01) |
| G06T 11/20 | (2006.01) |
| G10L 21/0272 | (2013.01) |
| G10L 25/87 | (2013.01) |

(52) U.S. Cl.
CPC ........... *G09B 19/00* (2013.01); *G06F 3/0482* (2013.01); *G06F 3/04817* (2013.01); *G06F 3/165* (2013.01); *G06T 11/206* (2013.01); *G09B 5/065* (2013.01); *G10L 21/0272* (2013.01); *G10L 25/87* (2013.01)

(58) Field of Classification Search
CPC .... G06F 3/0482; G06F 3/04817; G06F 3/165; G09B 5/065; H04L 12/1831
See application file for complete search history.

(56) References Cited

U.S. PATENT DOCUMENTS

| 7,124,164 B1* | 10/2006 | Chemtob | G06Q 10/10 709/204 |
|---|---|---|---|
| 2011/0271332 A1* | 11/2011 | Jones | H04L 9/3247 726/7 |
| 2016/0073056 A1* | 3/2016 | Katzman | H04N 7/15 348/14.07 |

* cited by examiner

*Primary Examiner* — Matthew Ell
*Assistant Examiner* — Zelalem W Shalu
(74) *Attorney, Agent, or Firm* — Richards Patent Law P.C.

(57) ABSTRACT

The present disclosure provides systems and methods for recording, documenting, and visualizing group conversations. More specifically, the present invention relates to systems and methods that allows users to record conversations, document each speaker, visualize the conversation in real time, play back the conversation with visualization for how the conversation progressed from person to person, and compile result statistics on participation levels.

14 Claims, 35 Drawing Sheets

SYSTEM AND METHOD FOR RECORDING, DOCUMENTING AND VISUALIZING GROUP CONVERSATIONS

CROSS-REFERENCE TO RELATED APPLICATIONS

This application incorporates by reference and claims the benefit of priority to U.S. Provisional Application 62/367,428 filed on Jul. 27, 2016.

BACKGROUND OF THE INVENTION

The present subject matter relates generally to a system and method for recording, documenting and visualizing group conversations.

Educators, organizations and governing bodies all understand the power of group discussion when it comes to learning, gaining perspective, and decision-making. However, the opinions and ideas advanced in group discussions may become distorted when certain viewpoints take over or dominate a conversation. Discussion moderators should, therefore, strive to include all voices, but sometimes it is difficult to identify patterns of dominance or situations where members of the group are not speaking up.

By recording conversations, moderators and participants may attempt to identify the more vocal and marginalized parties, but the task of sorting through an audio or even video recording would be daunting. An audio recording would require full playback in order to identify all the speakers. Users could potentially fast-forward a video recording, but identifying the speaker would be difficult depending on how the camera was positioned. Further, both recording methods lack an automated method for compiling statistics and viewing data about the levels of participation.

Further, more often than not, people are only interested in an overview of the discussion or just the interesting parts. Enabling efficient access to captured discussion recordings is essential in order to benefit from this content. Searching and browsing audiovisual information can be a time consuming task.

The ability to play back the discussion at multiple speeds, identifying speakers, organizing the audio or video recording, and analyzing data regarding the speakers' participation would be particularly useful in classroom settings, business settings, and social settings. Accordingly, there is a need for a system and method for recording group conversations, identifying speakers, playing back the conversation with clear visualization of the conversation's progress, and analyzing data about the conversation, as described herein.

BRIEF SUMMARY OF THE INVENTION

To meet the needs described above and others, the present disclosure provides systems and methods for recording group conversations, identifying speakers, playing back the visualization of the conversation's progress at multiple speeds, and presenting interactive visual graphics summarizing the conversation and participants.

More specifically, the present invention relates to systems and methods that allows users to record conversations, document each speaker, visualize the conversation in real time, play back the conversation with visualization for how the conversation progressed from person to person, and provide result statistics on participation levels.

The systems and methods described herein allows user to quickly and easily input information relating to the conversation in real time and then view that information in an easy-to-follow visualization in normal speed or in fast-forward mode at multiple speeds that covers multiple variables in the quality of the conversation. In an example, the system includes a computer software application running on a computer device equipped with technology for recording the conversation. The system can include an administrator or user that enters information about the conversation while it is taking place by identifying by tapping and/or selecting an icon representation of each participant as he or she speaks. Additionally, it may feature technology to allow users to share conversations with other users.

Conventionally, there is no easy to use system that can track classroom participation, much less analyze, compile, and display statistical results summarizing the participation of the students, for example. Such results can provide objective data for classroom participation to provide a participation score for each student. Conventionally, classroom participation is merely subjective based on the teacher's memory or feelings of how the class participation occurred. However, relying on memory is often fraught with error. Further, relying subjectively on a teacher's opinion is not as reliable as the present object system that monitors the participation of each student. Not only can the present system provide a platform for identifying the number of times each student spoke, the length of time each student spoke, as well as various evaluation characteristics to determine the quality or nature of the students' comments.

In an embodiment, the disclosure provides a system for visually representing an audio discussion session having a plurality of participants, the system comprising: a controller; a memory coupled to the controller, wherein the memory is configured to store program instructions executable by the controller; wherein in response to executing the program instructions, the controller is configured to: record an audio discussion among a plurality of participants, wherein each participant is visually represented by a participant icon; while recording, upon a first participant speaking, receive a first participant icon speaker selection, wherein the first participant icon speaker is selected from the plurality of participants; upon completion of the first participant speaking, receive a subsequent second participant icon speaker selection upon the commencement of the second participant speaking; and wherein upon playback, display a visual presentation of the audio discussion, wherein the visual presentation includes displaying a line connecting the first participant icon speaker to the second participant icon speaker at the time of completion of the first participant speaking and commencement of the second participant speaking.

In an embodiment, the disclosure provides a system for visually representing an audio discussion session having a plurality of participants, the system comprising: a controller; a memory coupled to the controller, wherein the memory is configured to store program instructions executable by the controller; wherein in response to executing the program instructions, the controller is configured to: record an audio discussion among a plurality of participants, wherein while recording receive a selection of a speaker at the time the speaker is speaking, wherein each speaker is selected from the plurality of participants; upon completion of the discussion, determining the length of time and number of times each participant spoke during the conversation; and display a results summary including a graphic visually representing the participation of the plurality of participants in the recorded discussion.

Although this specification is directed toward group discussions, the utility of the system described herein may be applied to a variety of contexts in which more than one person is speaking, including group performances or question-and-answer sessions. Further, although the disclosure relates to an example of recording an audio discussion, the technology described herein can apply to video discussions, such as webcast or video conferencing meetings, classes, discussions, among others.

An object of the present systems is to provide an easy and efficient way to review recorded group discussions.

Another object of the present systems is to provide a solution for easily compiling, analyzing, and reviewing data regarding group discussion dynamics, especially as it relates to equality and/or equity among participants.

An advantage of the present systems is that it provides a recording of a group discussion for future reference.

Another advantage of the present systems is that it allows the user to visualize the progression of the discussion with playback features featuring lines drawn to map out the conversation movement from speaker to speaker.

Another advantage of the present systems is that the visual playback, featuring lines drawn to chart the conversation from one participant to the next, may be viewed at multiple speeds, thus allowing the group to visualize the interaction of an entire discussion at a fraction of the original speed/duration.

A further advantage of the present systems is that it allows the user to record notes with observations about the discussion while it is taking place.

Yet another advantage of the present systems is that it provides group and individual participant analytics.

Another advantage of the present systems is that it is easy to use and efficient.

A further advantage of the present systems is that it allows the user to navigate to specific time points in the recording playback.

Yet another advantage of the present systems is that it compiles analytics about a discussion as it is happening.

Additional objects, advantages and novel features of the examples will be set forth in part in the description that follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present disclosure provides systems and methods for recording group conversations, identifying speakers, and presenting a visualization of the conversation. In an example, the visualization is in the form of various graphics, both static and dynamic, analyzing the participation during the conversation. In an example, the presentation or discussion can be played back at multiple speeds.

The systems and methods for recording, documenting, and visualizing group discussions allows at least one user to quickly and easily input information relating to the conversation in real time and view the input information in an easy-to-follow visualization in real time or in play back mode at multiple speeds that covers multiple variables in the conversation. In an example, the system can automatically identify the different participants by voice, wherein the system can automatically record and log the duration of time spoken, number of times spoken, and/or content of each speaker in real time. The system can include optional cameras, microphones, and/or audio speakers, among other recording and replay technologies.

Users of the application may maintain user accounts with a history of discussions, and users may access the application as a moderator, a facilitator, and/or a participant. Various permission settings can be implemented for each role. For example, a moderator may have the tools to record, document, and analyze conversations, while a participant may only access the conversations to review the subject matter discussed and quantitative results summary data.

To initiate the system, a user (i.e., moderator, facilitator, participant, teacher, student, etc.) may enter the application and choose to create a new group or select a previously saved group. If the user selects a previously saved the group, the application may direct the user to a menu featuring names of the previously saved groups along with details about the group, such as number of participants. The user may then select their group of choice. In addition, the user can edit the participants of the group, for example, if one participant is absent from the present discussion that was present in the previous session.

Figure 1:
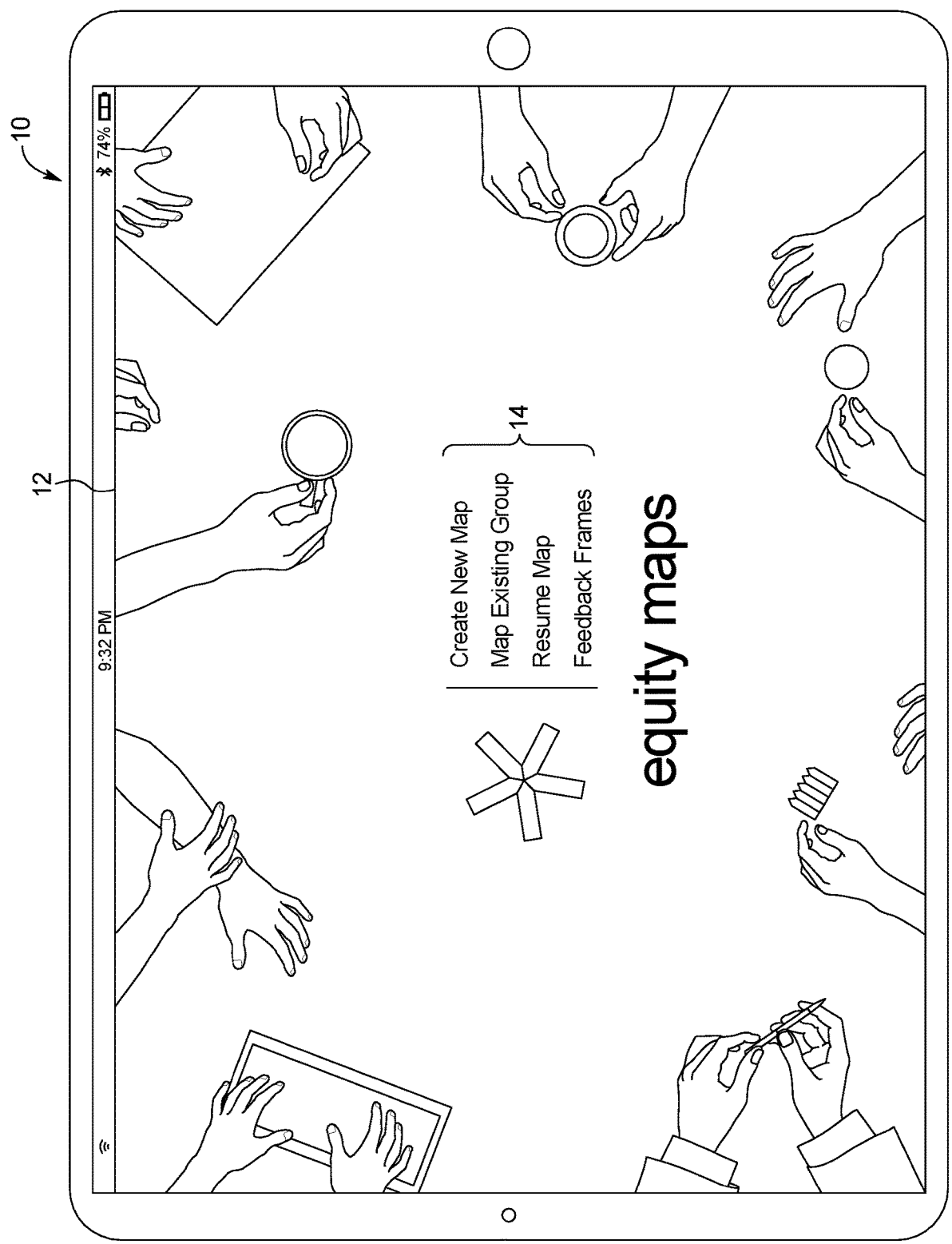
FIG. 1 is an illustration of a user interface from the software application, showing a menu where users may select an existing group or create a new group.
Figure 2:
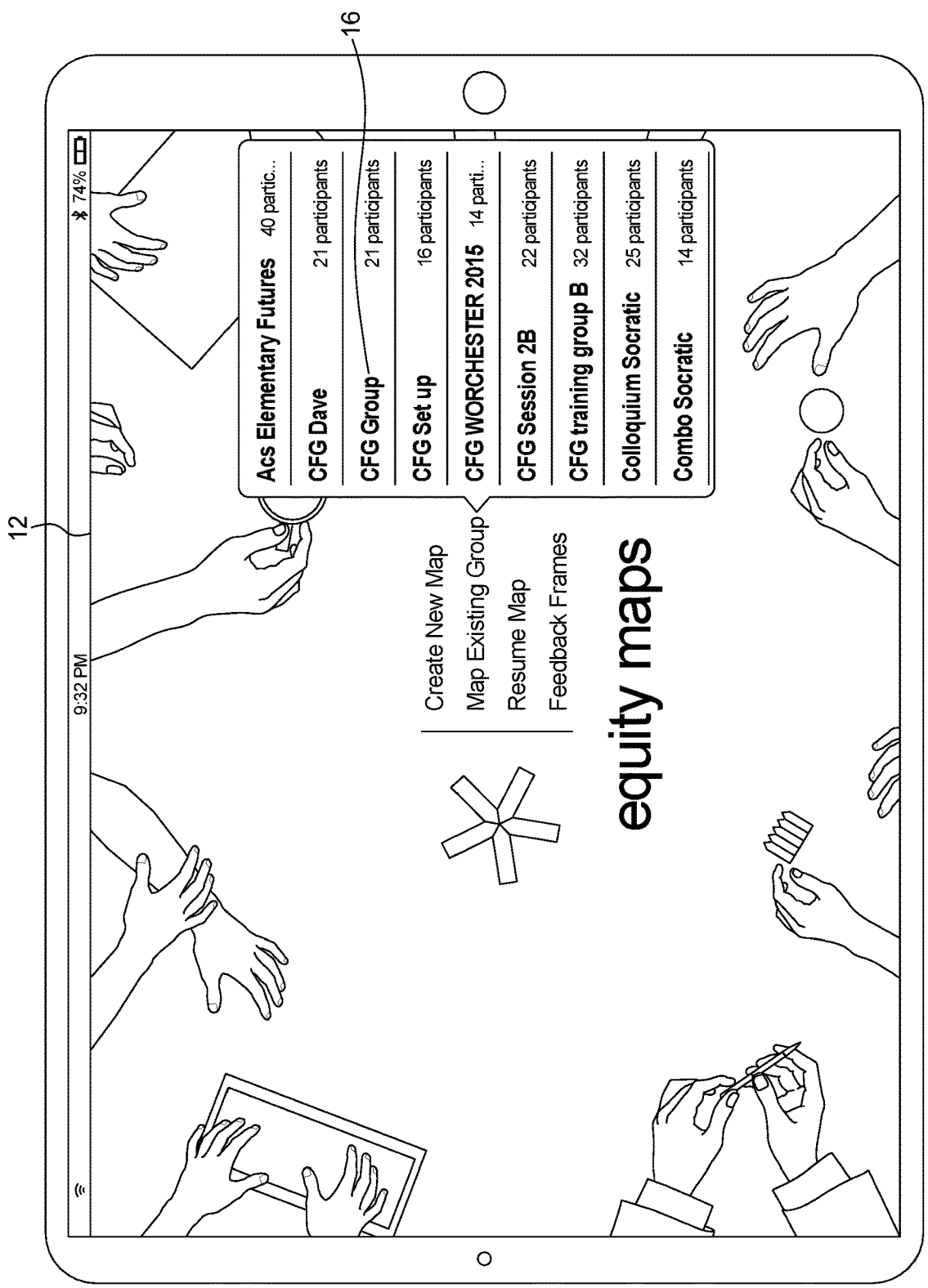
FIG. 2 depicts a schematic of a user interface illustrating an example of the menu in FIG. 1 with an additional menu for selecting a previously saved group.

As shown in FIG. 1, the system 10 can a user interface 12 displaying a menu 14 where users may select an existing group 16 or create a new group. For example, the system 10 can include an option for saving the group members 18 of each conversation into a group 16, wherein the system can save a plurality of conversations previously recorded for each group. For example, FIG. 2 depicts a schematic of a user interface illustrating an example of the menu for selecting a previously saved group 16. In addition, the system 10 can store and recall various information graphics for each conversation, and information graphics summarizing multiple conversations for each group. For example, the system can compare the most recent conversation of a specific group to the average results from all of the previously recorded discussions for the specific group, a different group, or average of different groups.

If creating a new group, the user may then be directed to a page that allows the user to name the group and to choose or customize a seating configuration. In an embodiment, the application will include illustrations of human figures to represent the participants in the conversation.

Figure 3:
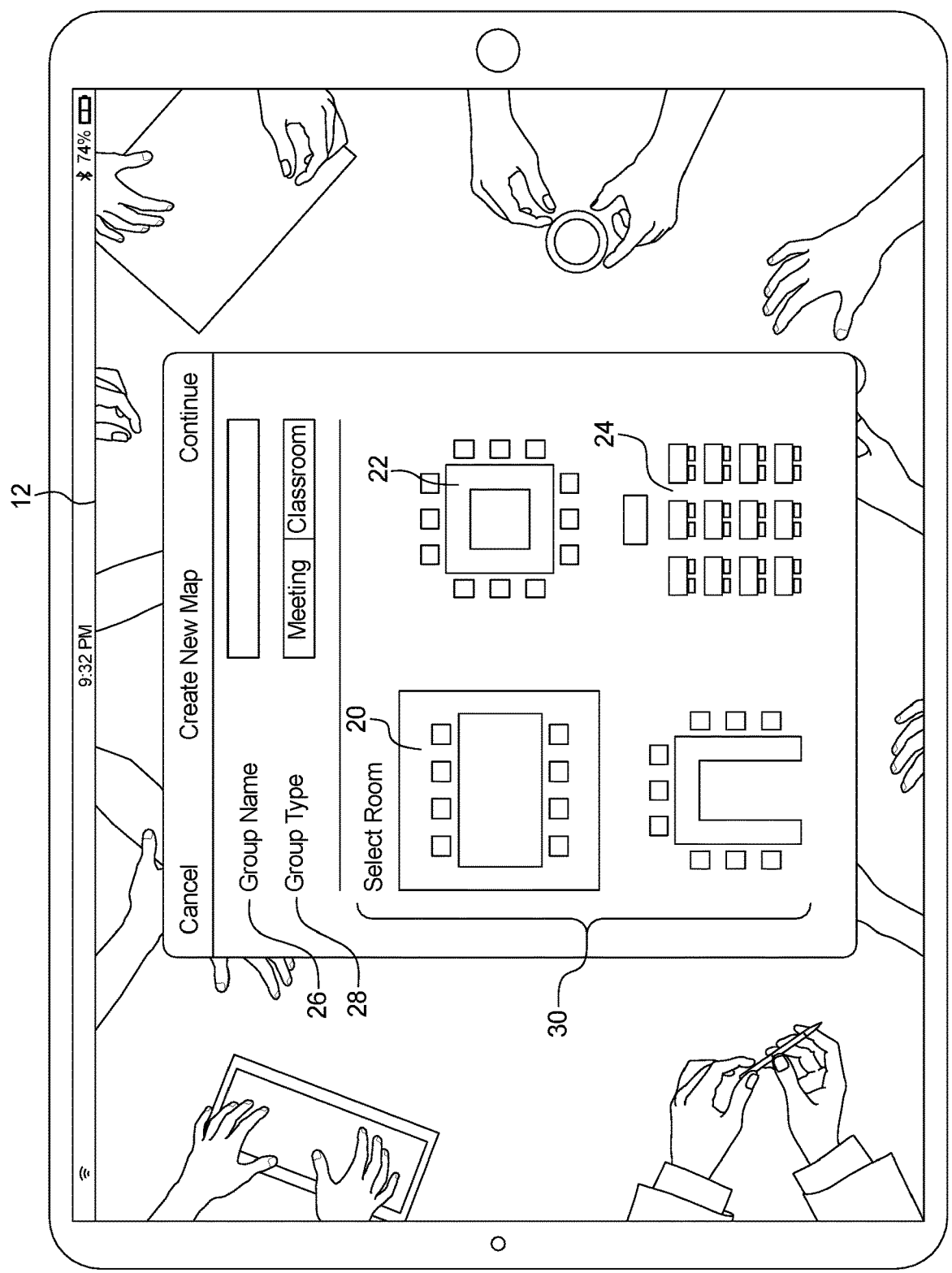
FIG. 3 depicts a schematic of a user interface illustrating an exemplary menu from which users may choose seating configurations for their group discussion and enter the name of the group. This menu can also give the user the option to view classroom seating arrangements by selecting the Classroom button.
Figure 4:
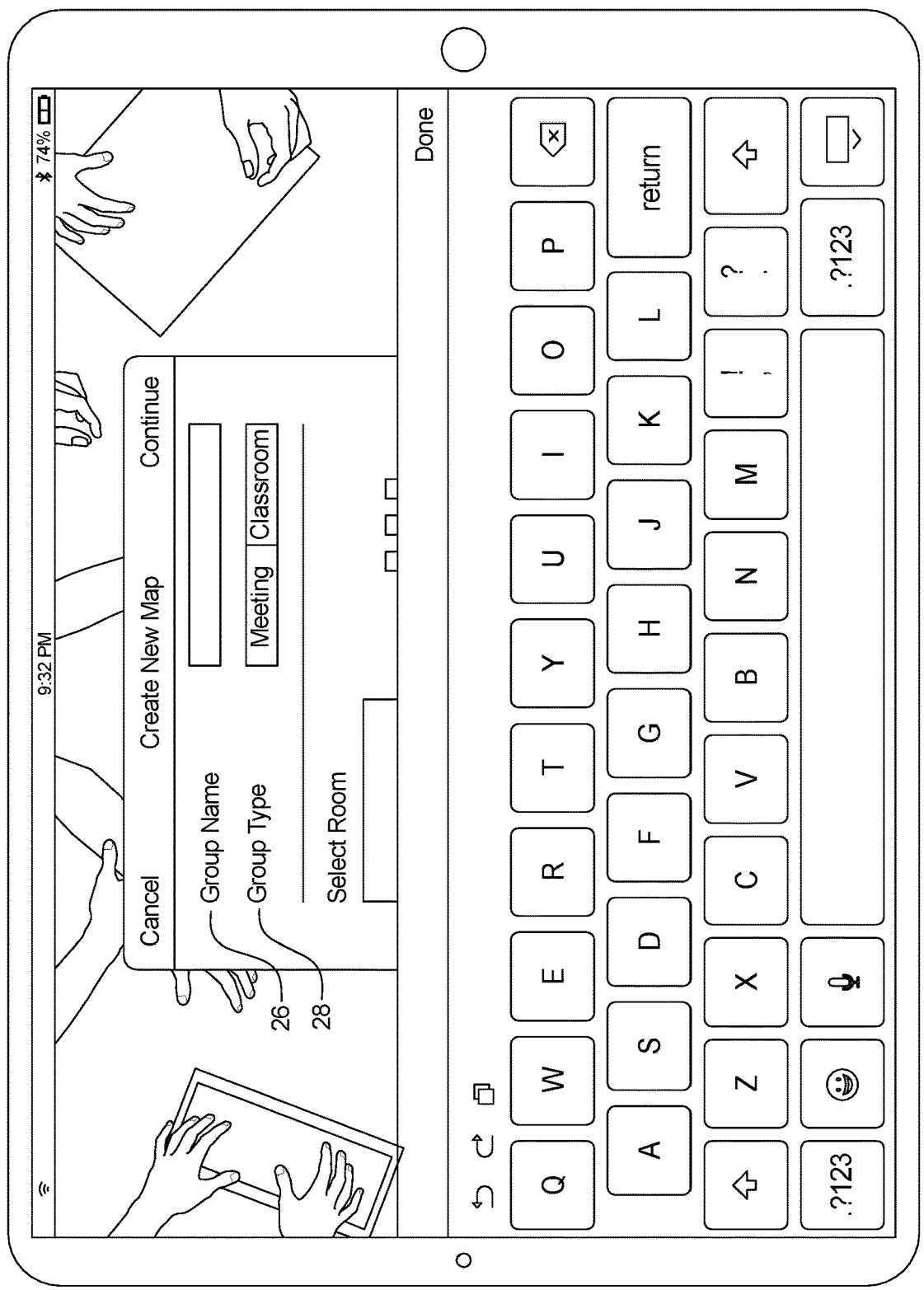
FIG. 4 depicts a schematic of a user interface illustrating the menu in FIG. 3 with keyboard functionality for entering the name of the discussion group.

FIG. 3 depicts a schematic of a user interface illustrating an exemplary menu for creating a new group. A user can input a group name 26 and a group type 28 (e.g., meeting, classroom, presentation, etc.). The system can include a pop up keyboard for inputting text, as shown in FIG. 4. The system can also enable a user to select a seating configuration 30 for the group discussion. The seating configuration 30 can include a round-table format 20, board room format 22, classroom format 24, among others. The user may also have the option to design their own seating configuration 30, potentially using multiple tables. The user may select a configuration or create a new configuration that matches the physical configuration of the participants in the group discussion in order to efficiently identify the speakers as they participate. However, to use the system it is not necessary that the participants match the configuration that the user designates.

After choosing a seating configuration, the user may identify the conversation participants by name using a feature that allows the user to add participants. It should be understood the participant 18 can be the user, moderator, facilitator, student, teacher, etc. Further, the icon can be gender specific for females and males. The add participant feature may also give the user the ability to copy individuals from prior saved groups. As the individuals in the group are named, the software may create icons for them and display the name above the icon representing the participant 18. These participant icons may be displayed in on the user interface. The user may then place the participants within the seating configuration using a drag and drop method.

Figure 5:
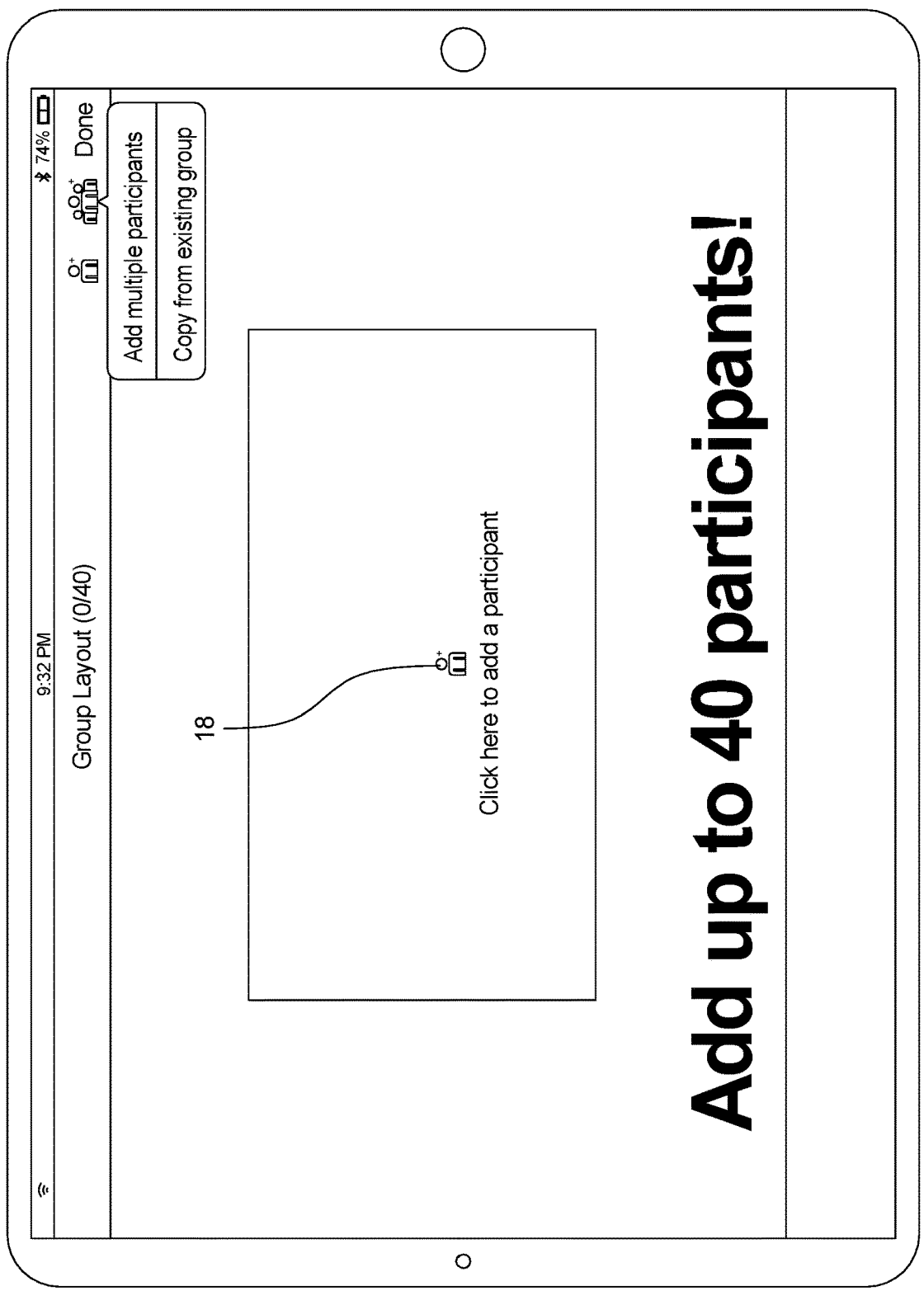
FIG. 5 depicts a schematic of a user interface illustrating participant adding feature. The user may activate a command in the center of the group configuration or the user may access a menu in the top right corner of the screen and add multiple participants or choose participants from an existing group.
Figure 6:
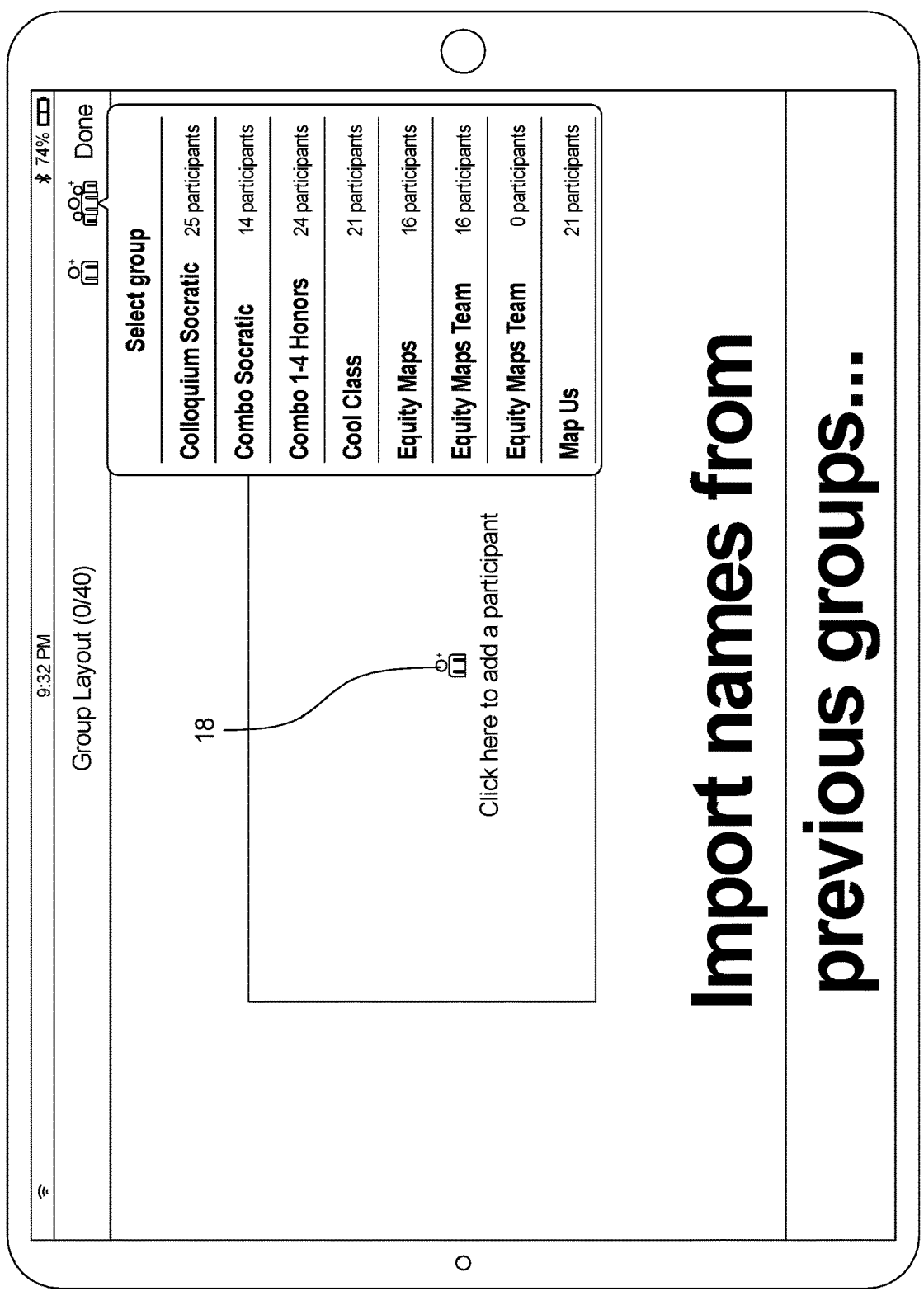
FIGS. 6-7 depicts a schematic of a user interface illustrating the interface in FIG. 5 with a menu for selecting previously-saved groups and a pop-up window verifying that the user would like to copy an existing group.
Figure 7:
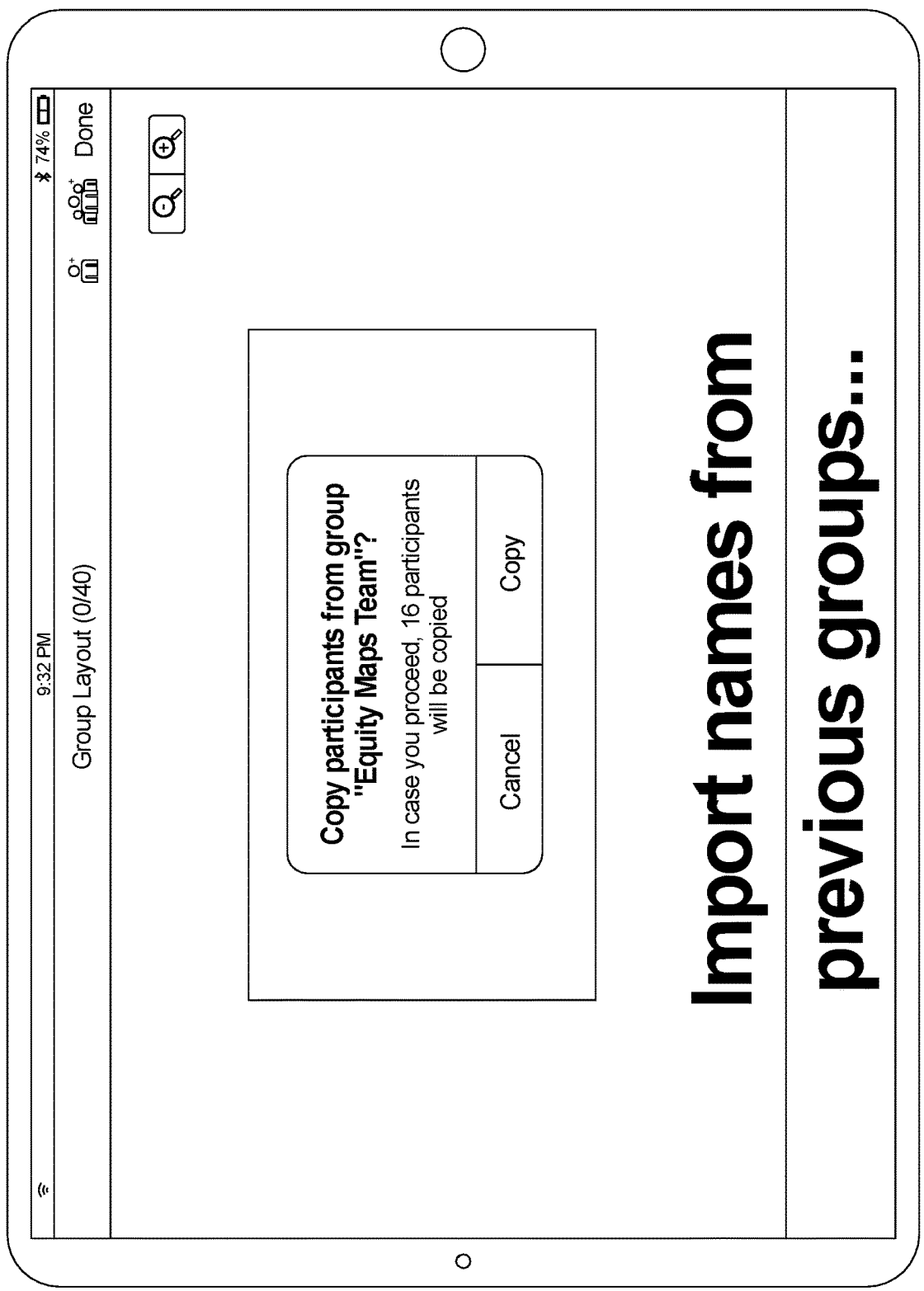

FIG. 5 depicts a schematic of a user interface illustrating for a participant adding feature. The user may activate a command in the center of the group configuration or the user may access a menu in the top right corner of the screen and add multiple participants (i.e., group members 18) or choose participants from an existing group. For example, FIGS. 6-7 depict a menu for selecting previously-saved groups and a pop-up window verifying that the user would like to copy an existing group.

Figure 8:
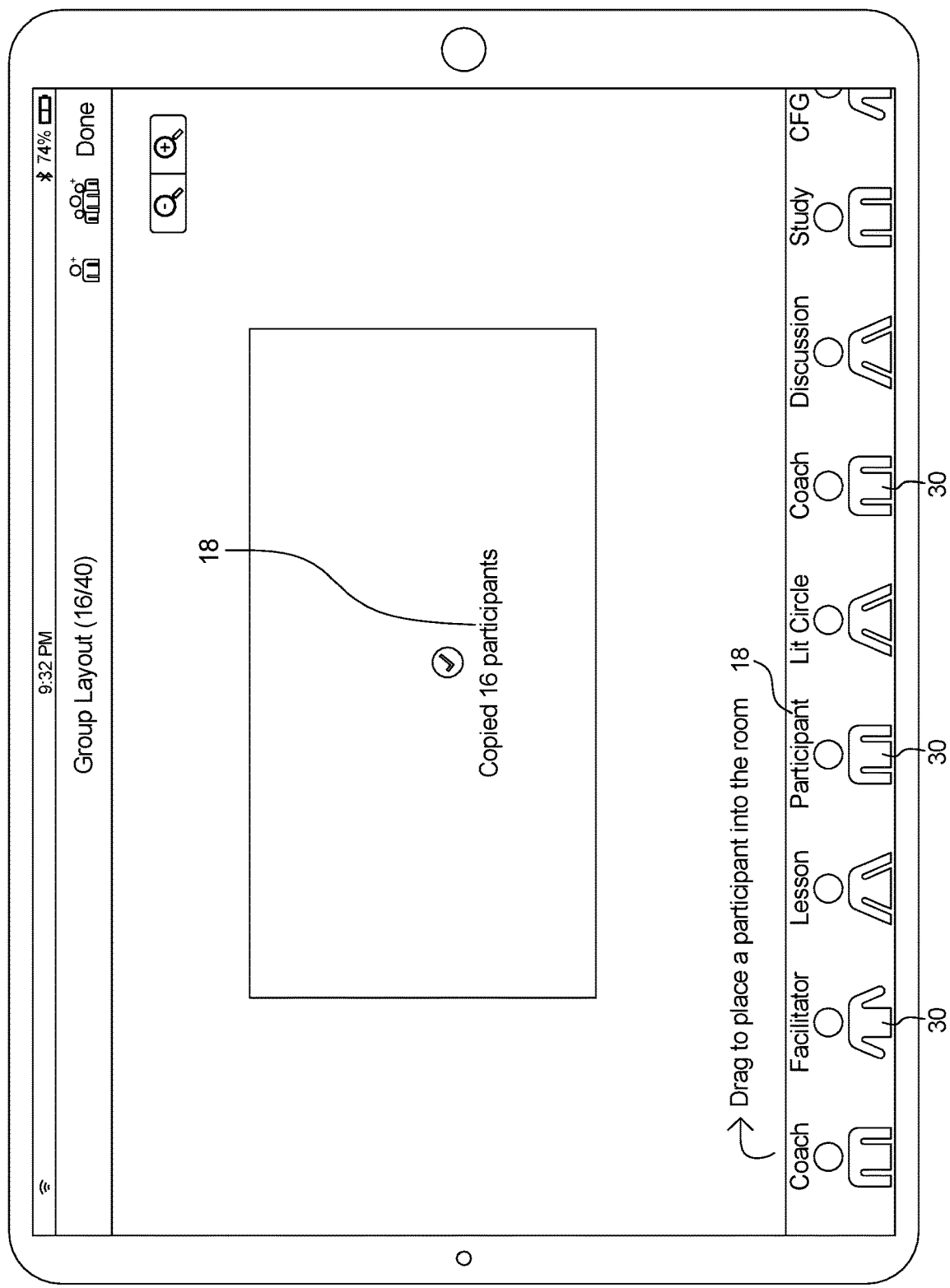
FIG. 8 depicts a schematic of a user interface illustrating an exemplary user interface where users may drag icons representing group participants to places around the virtual table. The virtual table appears in the middle of the screen and the group participants are arranged at the bottom of the screen. The icons appear in different colors and styles to indicate male or female participants.

FIG. 8 depicts a schematic of a user interface illustrating the ability of users to drag icons 32 representing group participants 18 to places within the seating arrangement selected. For example, a virtual table can appear in the middle of the screen and the group participants are arranged at the bottom of the screen. The system may differentiate participants 18 by creating a unique color scheme for the seating configuration 30 where no participants sitting next to each other have the same color. The user or moderator may switch the colors as needed in order to maintain consistency between participants and colors, or the moderator may designate colors that the system did not automatically assign. Further, the moderator may have the option of using one color twice in order to identify participants of a like group. In an example, the icons can appear in different colors and styles to indicate male or female participants.

Figure 9:
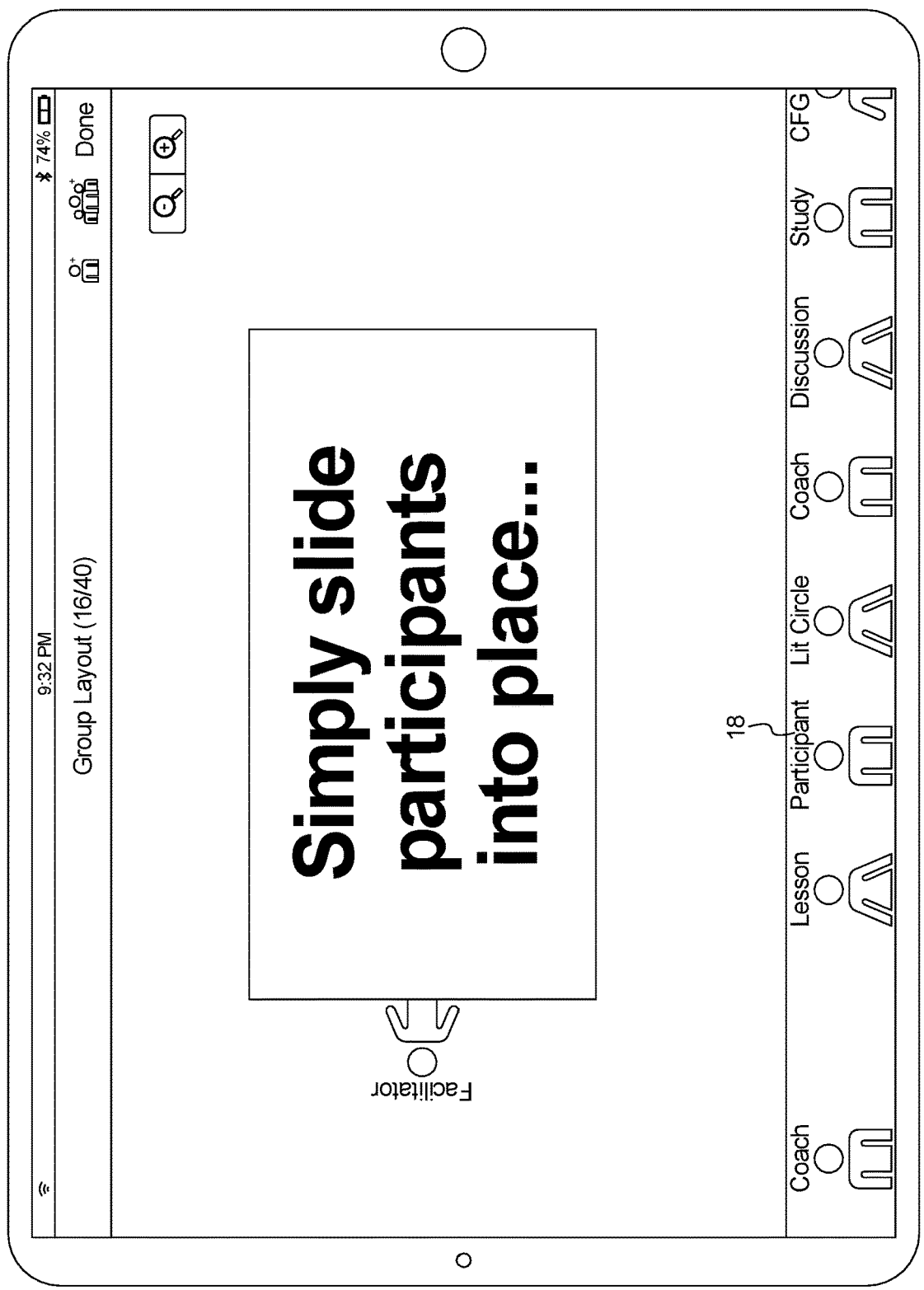
FIG. 9 depicts a schematic of a user interface wherein an icon representing a group participant has been placed around the virtual table.
Figure 10A:
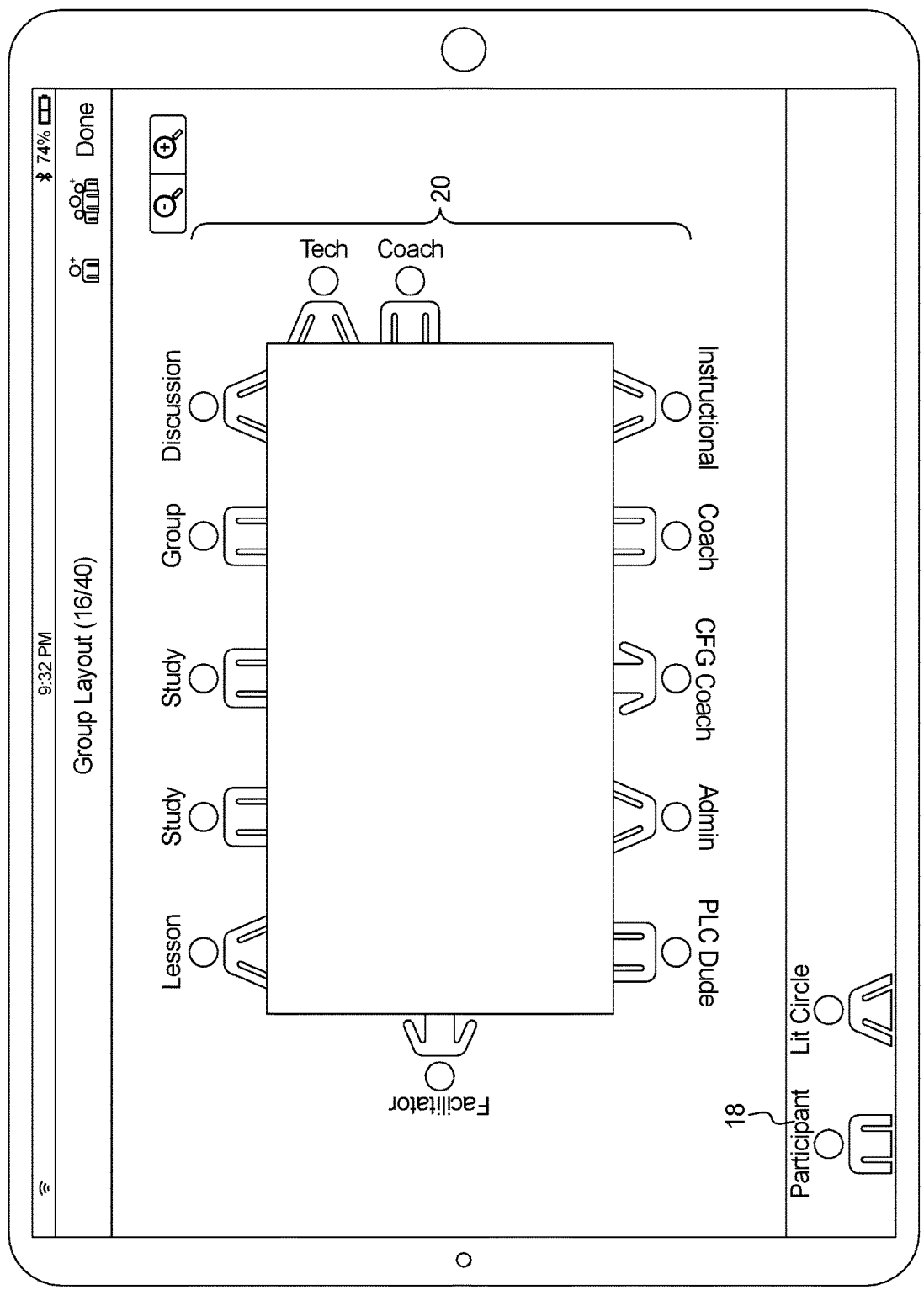
FIGS. 10A-10B depicts a schematic of a user interface illustrating the interface from FIG. 9 with additional icons placed around the virtual table (FIG. 10A) and or with icons placed in a circle (FIG. 10B).
Figure 10B:
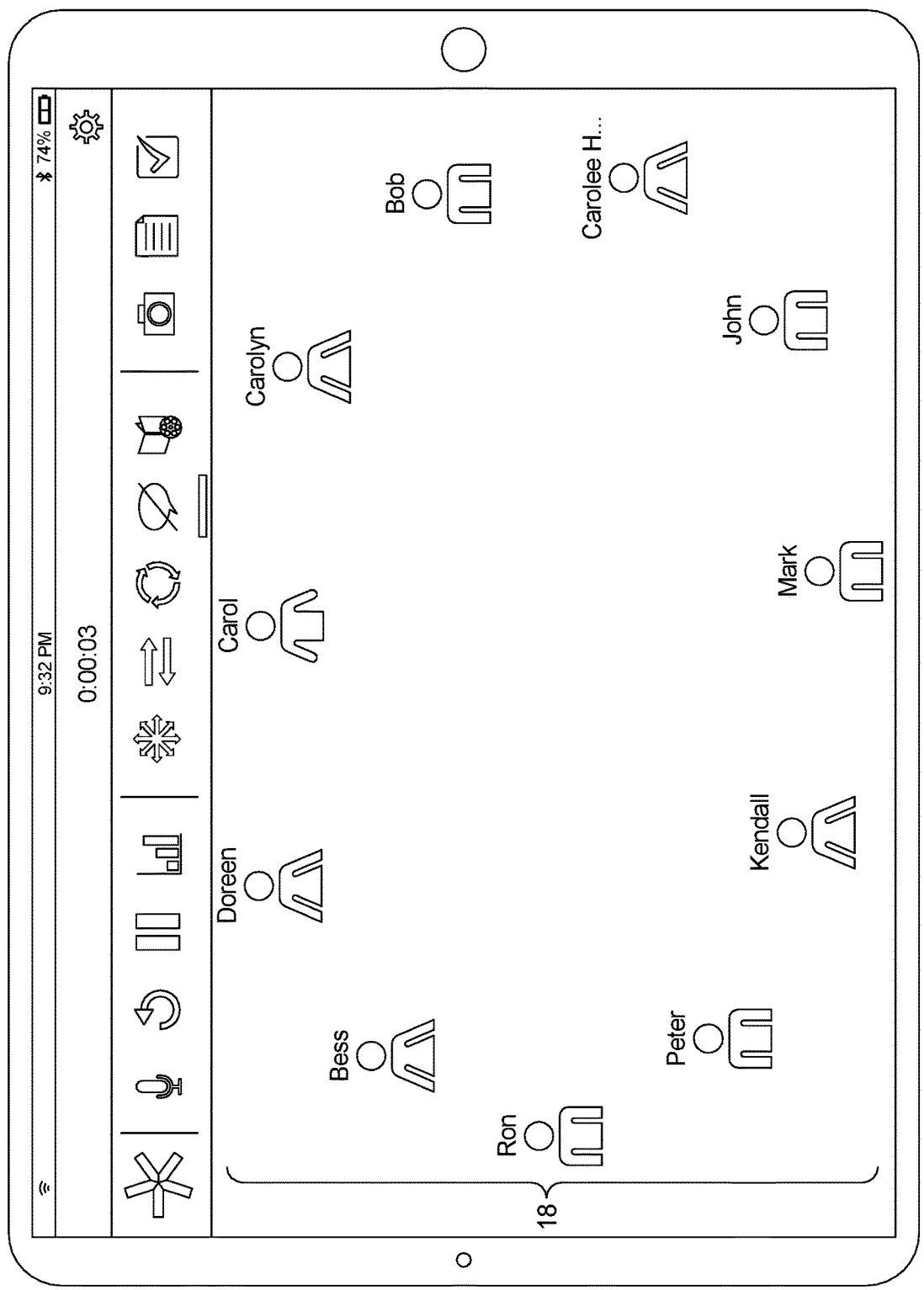

FIG. 9 depicts where an icon representing a group participant has been placed around the virtual table. Further, FIG. 10A depicts additional icons placed around the virtual table, for example, a mentor icon being placed into position. Alternatively, as shown in FIG. 10B, the participants 18 can be automatically placed or user placed in a circle without a shown table, desks, etc.

When the group configuration and participants have been selected, the software may display the group in a user interface with a command for starting the conversation, such as a play button. This interface may also include an option to edit the layout of the group discussion or navigate back to the opening menu for the software.

Figure 11:
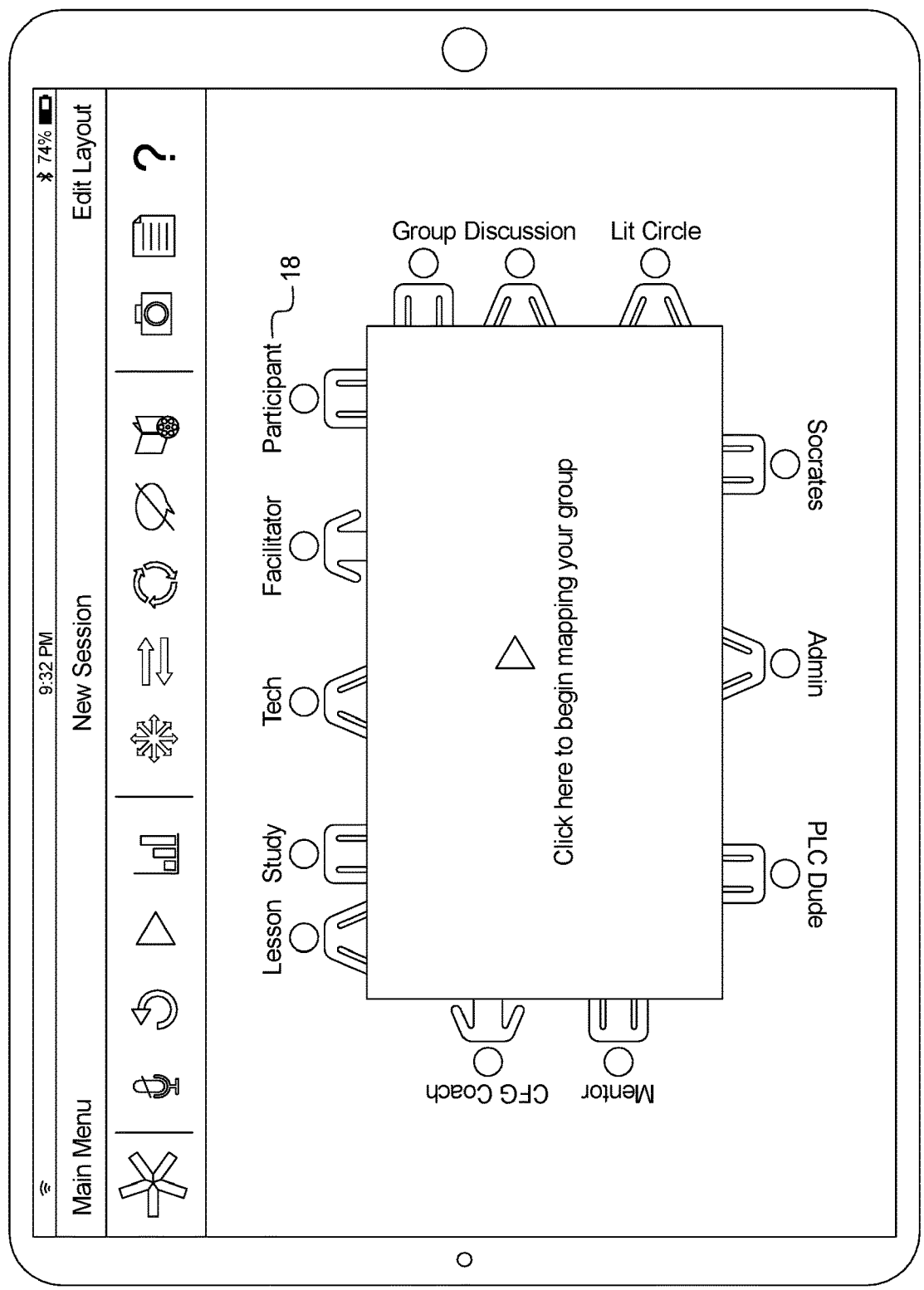
FIG. 11 depicts a schematic of an exemplary user interface for starting the recording of a group discussion. This screen includes an option for navigating back to the main menu or for editing the layout of the seating configuration.

For example, FIG. 11 depicts a schematic of a user interface for starting the recording of a group discussion. This screen includes an option for navigating back to the main menu or for editing the layout of the seating configuration.

By selecting the start command, the user will initiate a recording of the group discussion. A counter (e.g., clock) may also display on the screen to show how much time the conversation is taking. In addition, the application may also include options for undoing a designated speaker (in case the moderator selects a participant in error) and for pausing the meeting so the recording does not include long stretches of silence during breaks.

While the discussion is taking place, the moderator user may indicate who is speaking each time another person speaks. The moderator may accomplish this by selecting the corresponding participant icon to indicate who is speaking (i.e., clicking on the participant icon associated with the present speaker). When a new person speaks, the moderator user then selects the icon representing the new speaker. By identifying the speakers during the conversation, each participant will have a distinct, visual cue displayed or highlighted during playback while that participant is speaking. In addition, each participant is associated with a plurality of sound clips for each time he or she spoke, wherein the sound clips can be played back separately at the user's command.

While the user is selecting speakers, the software interface may visually depict the progression of the conversation from one person to the next across the illustrated seating configuration by drawing lines from one person to the next in coordination with the changing of the speaker.

Figure 12:
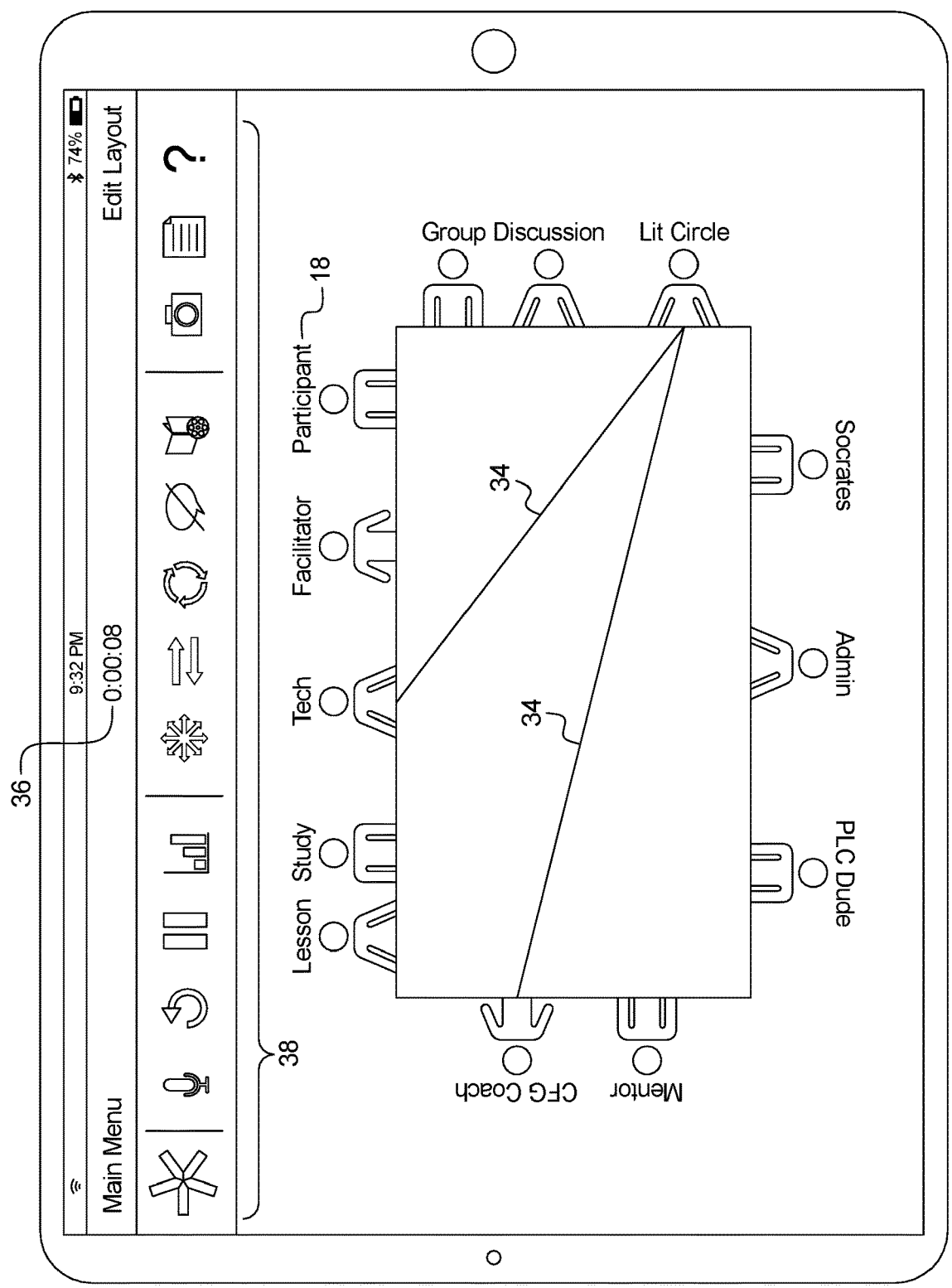
FIG. 12 depicts a schematic of an exemplary user interface as the discussion recording takes place. Lines across the virtual table indicate the progression of the discussion. A counter at the top of the screen indicates how long the discussion has taken. A menu bar across the top of the screen allows the user to access other features within the software.

FIG. 12 depicts a schematic of a user interface illustrating an exemplary user interface as the discussion recording takes place. Lines 34 connecting participants 18 across the virtual table indicate the progression of the discussion. A time counter 36 (e.g., clock, timer, etc.) at the top of the screen indicates how long the discussion has taken. A menu bar 38 across the top of the screen allows the user to access other features within the software.

Figure 13:
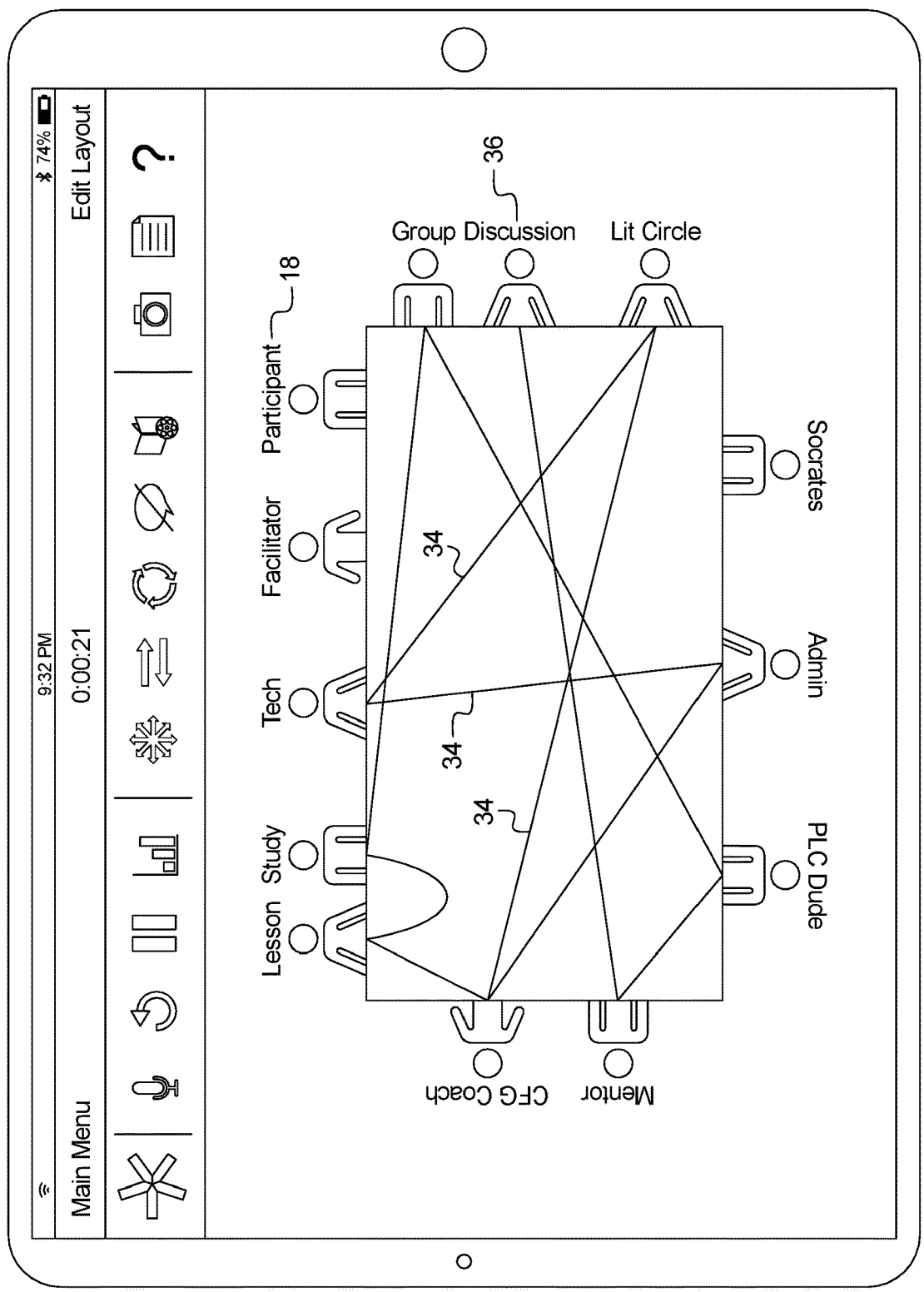
FIG. 13 depicts a schematic of a user interface illustrating the recording interface with additional lines representing the ongoing progression of the conversation. In this illustration, the orange "Discussion" figure is highlighted, indicating that the person the icon represents is speaking.

FIG. 13 depicts a schematic of a user interface illustrating the recording interface with additional lines representing the ongoing progression of the conversation. In this illustration, the "Discussion" icon 36 is highlighted, indicating that the person represented by the icon is speaking.

During the group discussion, the moderator user may use additional features to indicate periods of silence, chaos (where more than one person is speaking), exchanges between two people, small group discussion, or presentations to the group such as films or slideshows. These options allow the recording to include times where no single speaker is talking, thereby preventing a situation where the statistical analysis was flawed due to one person being recorded as the speaker for too long (for example, in a situation where one person's comments were followed by a period of silence).

Figure 14:
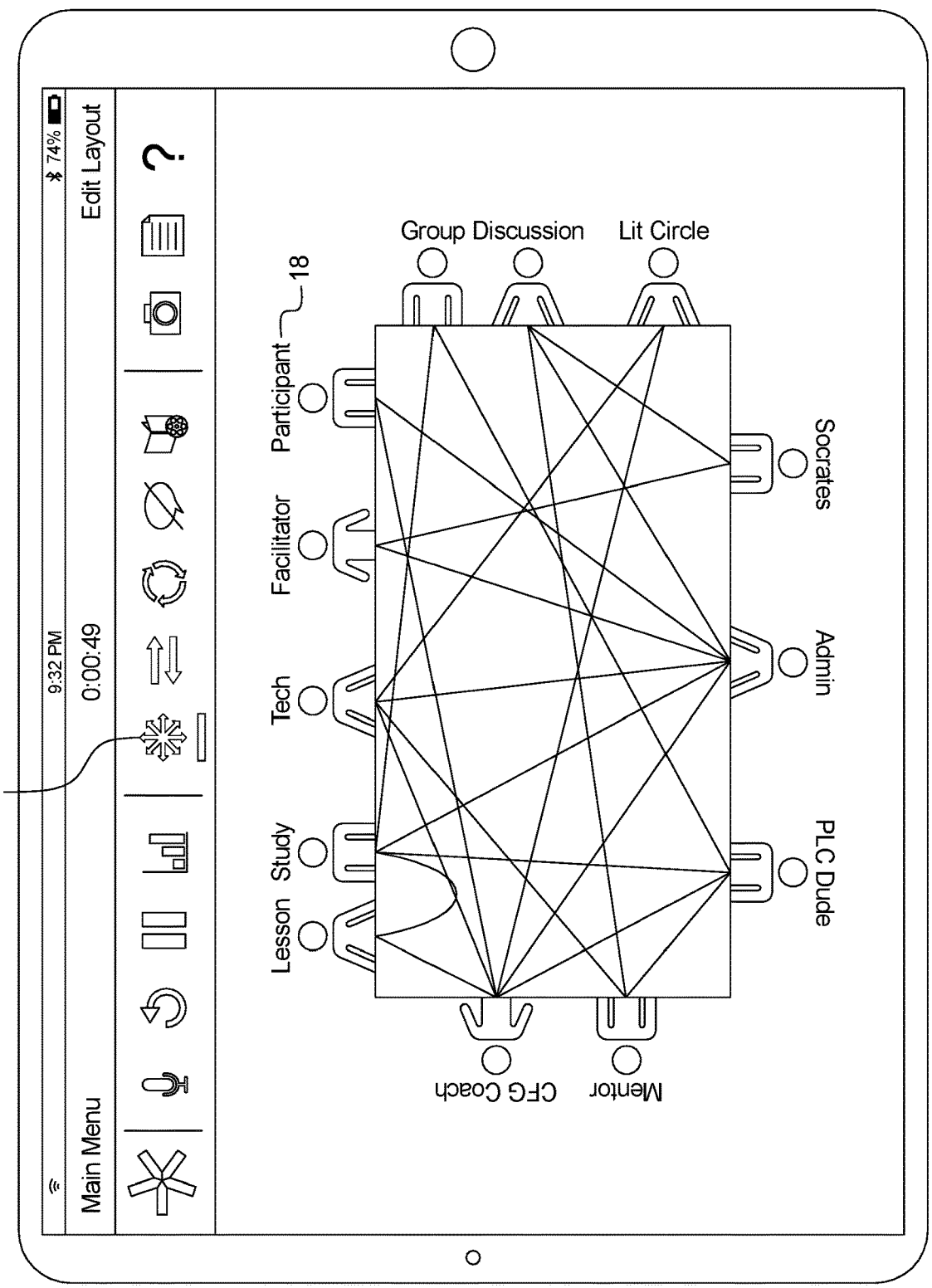
FIG. 14 depicts a schematic of a user interface illustrating the recording interface with the "Chaos" button activated. A bar underneath the button may indicate that "Chaos" has been selected. The "Chaos" option may record times in the discussion where no single person is speaking.

FIG. 14 depicts a schematic of a user interface illustrating the recording interface with the "Chaos" icon 38 activated. A bar underneath the button may indicate that "Chaos" has been selected. The "Chaos" option may record times in the discussion where no single person is speaking, but rather many people are speaking at once.

Figure 15:
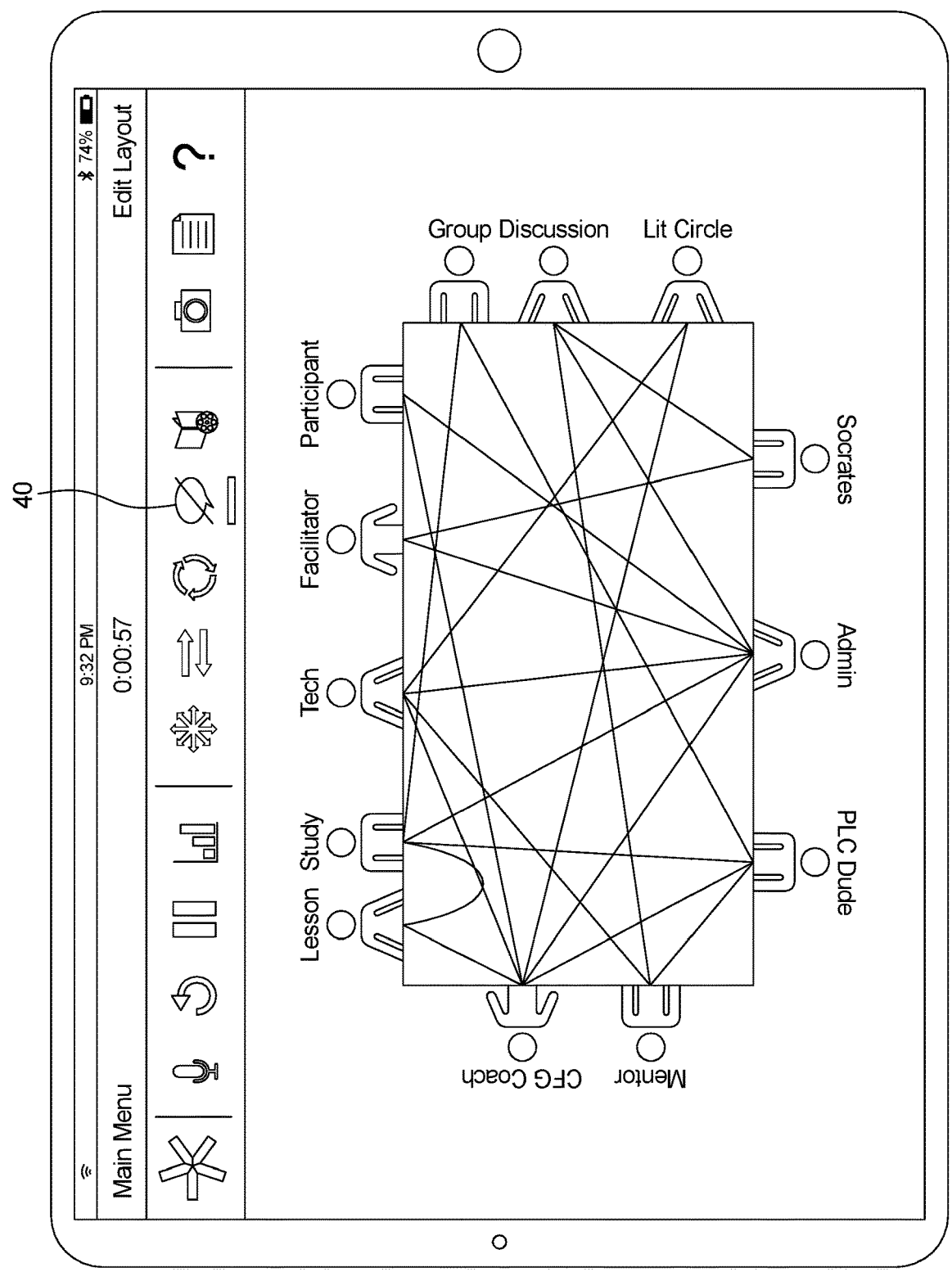
FIG. 15 depicts a schematic of a user interface illustrating the recording interface with the "Silence" button activated. A bar underneath the button may indicate that "Silence" has been selected. The "Silence" option may record times in the discussion when no one is speaking.

FIG. 15 depicts a schematic of a user interface illustrating the recording interface with the "Silence" button activated. A visual bar underneath the button may indicate that "Silence" has been selected. However, any suitable visual method can be used, such as highlighting the "Silence" button, among others. The "Silence" option may record times in the discussion when no one is speaking.

The system may also include features to allow the user to take notes about the conversation while it is happening or take screenshots of the conversation at a certain point. The user may have access to a text box for entering the notes, wherein the system automatically connects the note with a time stamp in the conversation. In an example, upon playback, the notes or a link to the notes can appear along the timeline reference points corresponding to the time the note was taken.

Figure 16:
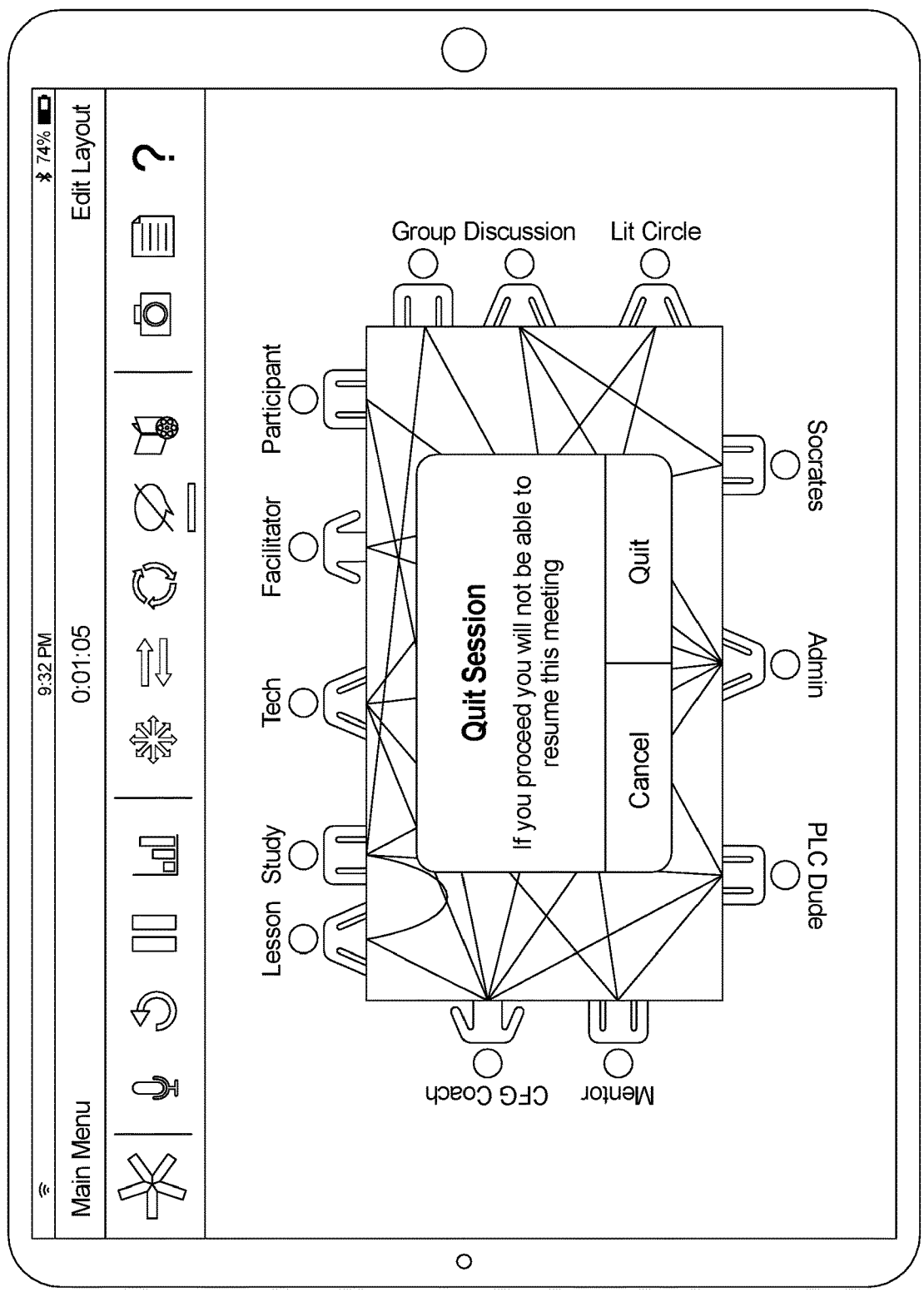
FIG. 16 depicts a schematic of a user interface illustrating a pop-up window asking the user if they are ready to quit the recording session.

In an example, the menu bar can include an icon for quitting or stopping the recording of the session. In an example, FIG. 16 depicts a schematic of a user interface illustrating a pop-up window asking the user if they are ready to quit the recording session. The quit session prompt or pop up can be activated, for example, after a predetermined amount of time of inaction from the mentor or facilitator, or after a predetermined time of silence or no discussion.

If the user decides to proceed with ending the conversation, the application may direct the user to another page of the software, where the user may view the final statistical results for the discussion.

Figure 17:
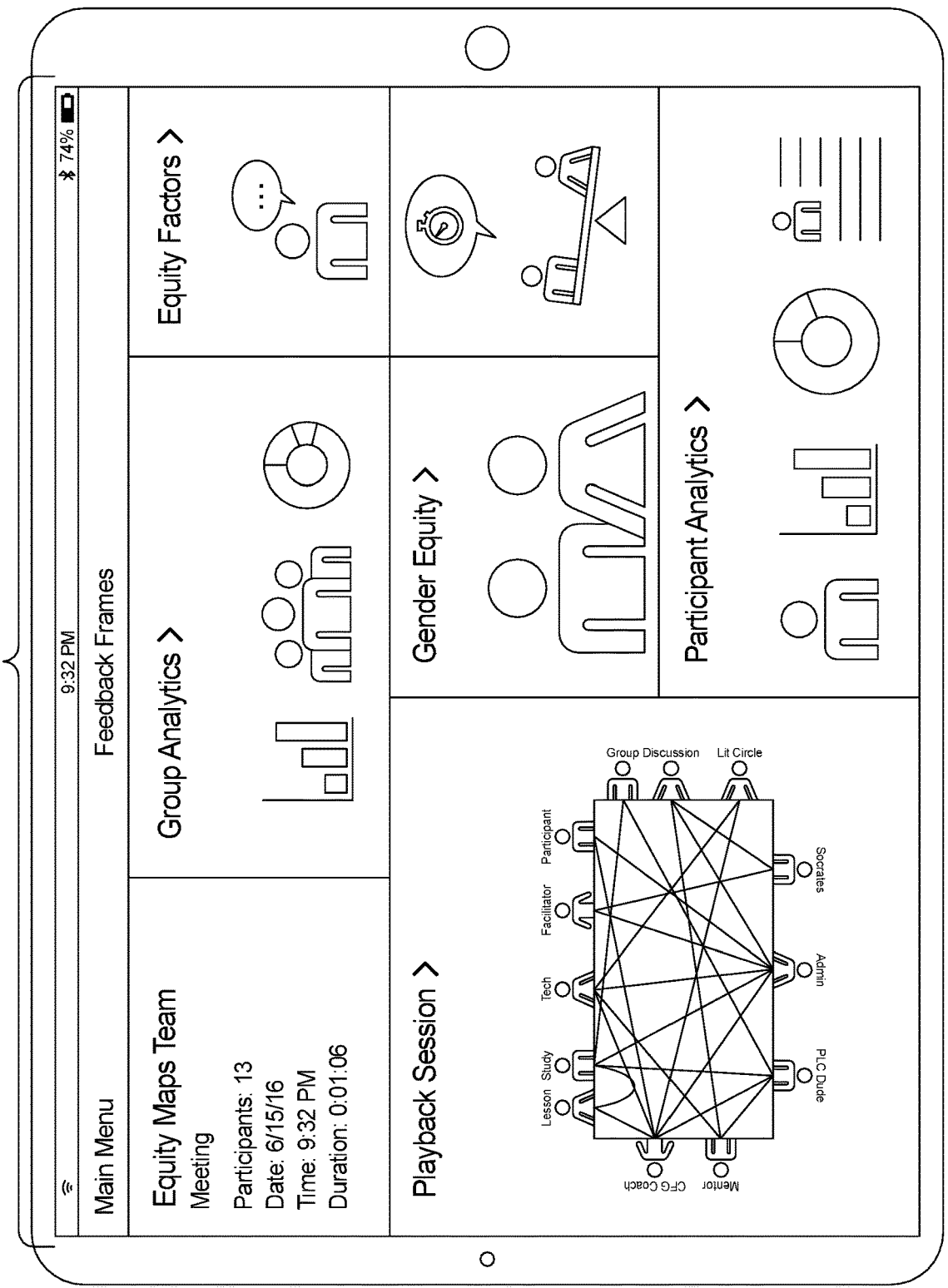
FIG. 17 depicts a schematic of a user interface illustrating an exemplary interface including options to navigate to other features of the software.

As shown in FIG. 17, the result summary page 44 may include topic headings to navigate the user to the metrics relating to the discussion. These topics may include group analytics, a breakdown of the gender representation in the conversation, individual participant analytics, and basic data about the conversation. The results page may also include an option to access a playback of the conversation.

Figure 18:
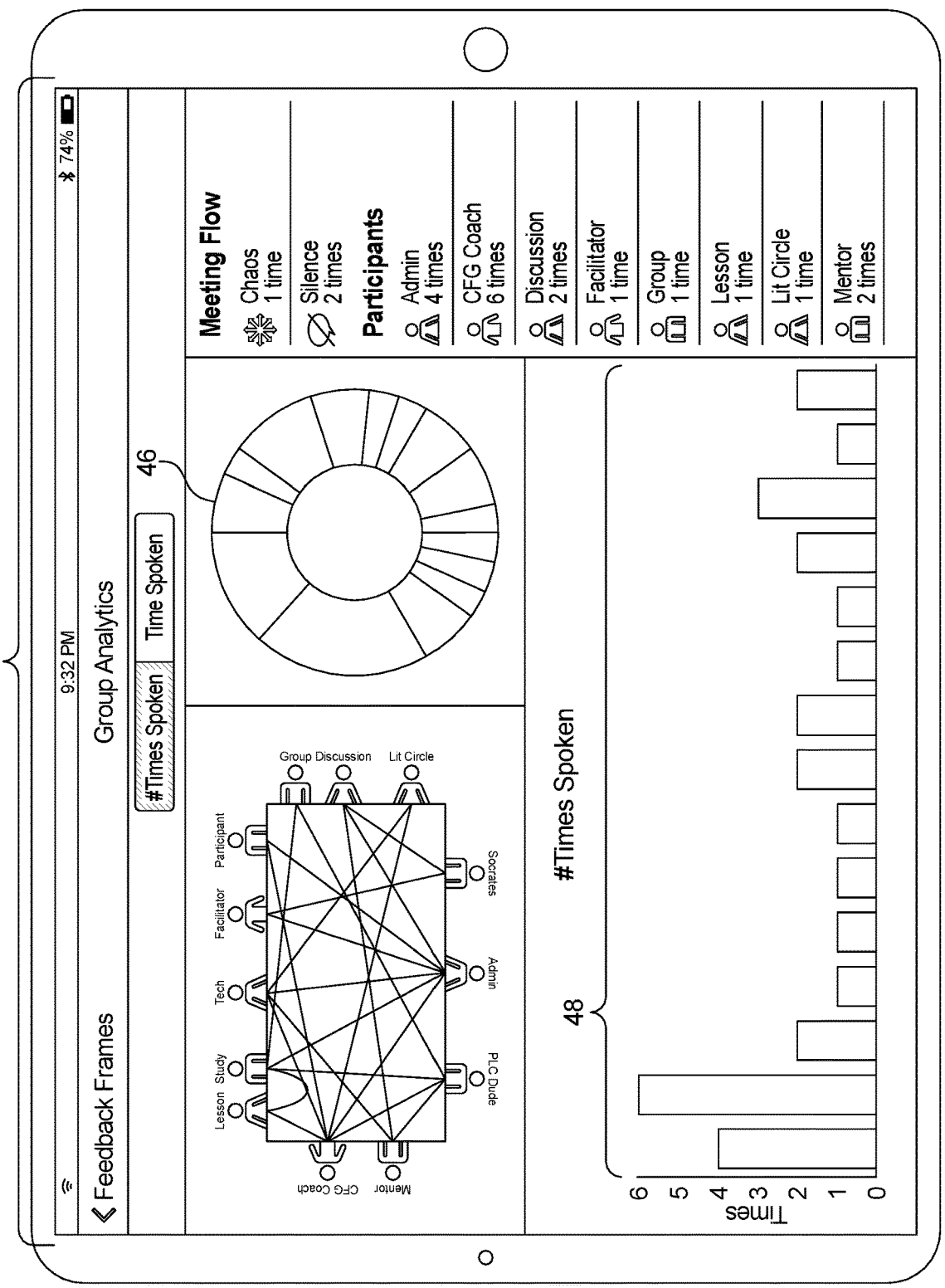
FIG. 18 depicts a schematic of a user interface illustrating an exemplary data about how often each group participant spoke.
Figure 20:
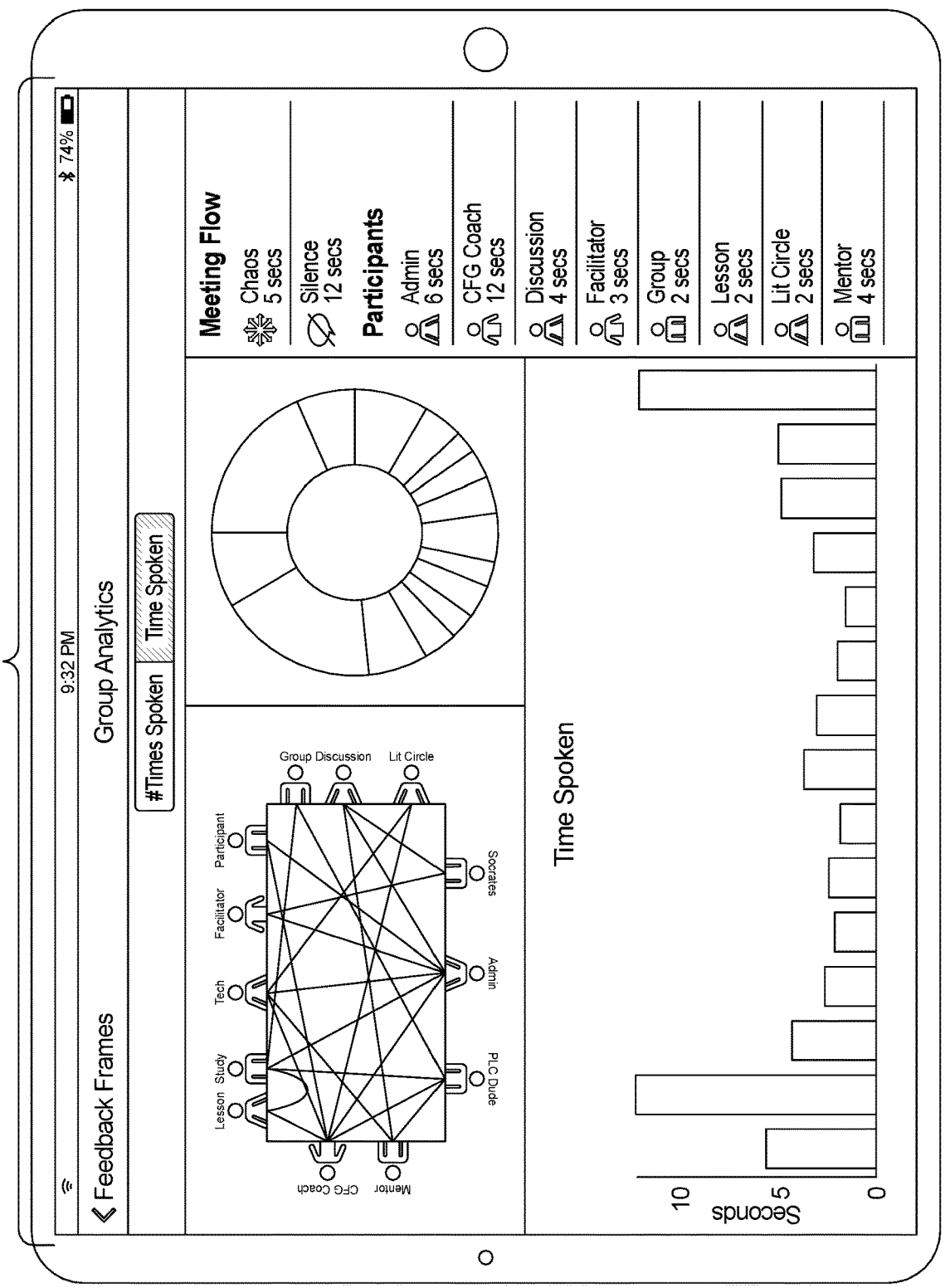
FIG. 20 depicts a schematic of a user interface illustrating data regarding the length of time each group participant spoke.

FIG. 18 depicts a schematic of a user interface illustrating an exemplary data about how often (i.e., number of times) each group participant spoke. FIG. 20 depicts a schematic of a user interface illustrating data regarding the length of time each group participant spoke. The proportion of time or amount of times a participant spoke can be represented in a pie graph 46, bar graph 48, line graph, among others. The graphs can be color coded or pattern specific for each participant.

Figure 19:
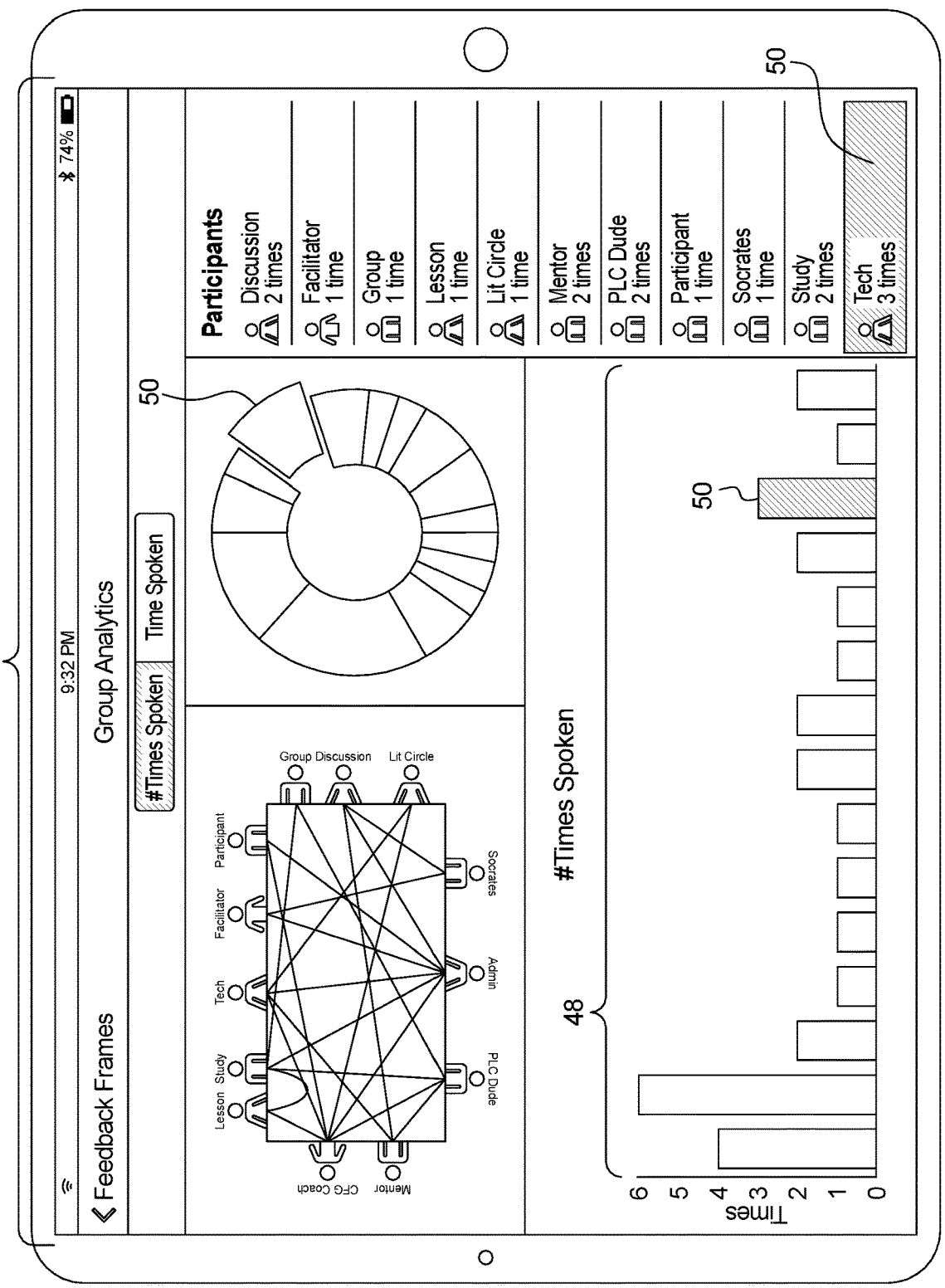
FIG. 19 depicts a schematic of a user interface illustrating the screen in FIG. 18 with one of the participant results highlighted to illuminate that participant's level of participation in various charts appearing on the screen.
Figure 21:
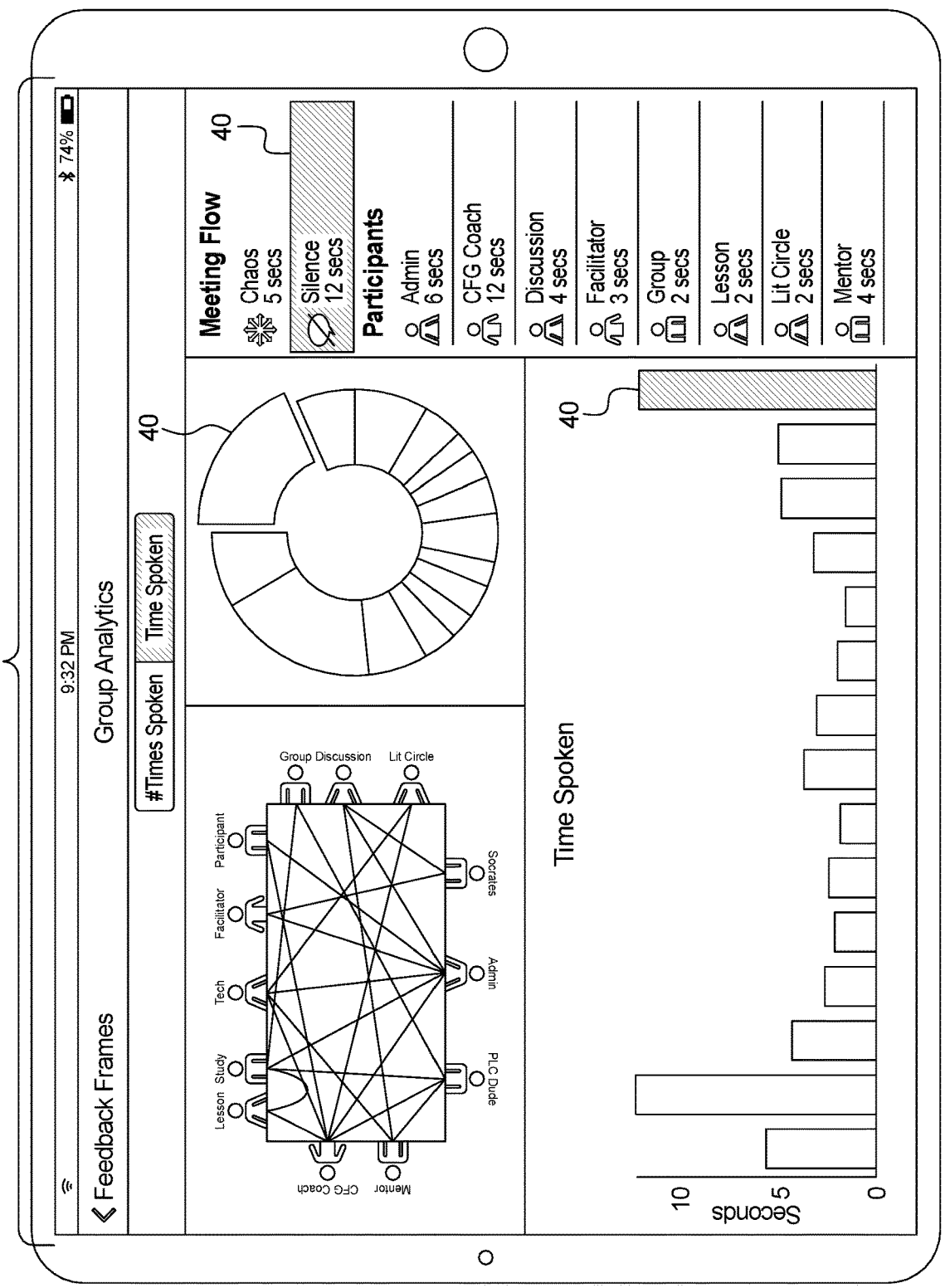
FIG. 21 depicts a schematic of a user interface in FIG. 20 with highlighting on the "Silence" selection to indicate the data relating to how long the conversation was silent.

In an example, upon selecting a specific participant, the system can visually highlight 50 the selected participant's portion of the visual representation of participation in the discussion. FIG. 19 depicts a schematic of a user interface illustrating the screen in FIG. 18 with one of the participant results highlighted to illuminate that participant's level of participation in various charts appearing on the screen. FIG. 21 depicts a schematic of a user interface in FIG. 20 with highlighting on the "Silence" selection to indicate the data relating to how long the conversation was silent.

Figure 22:
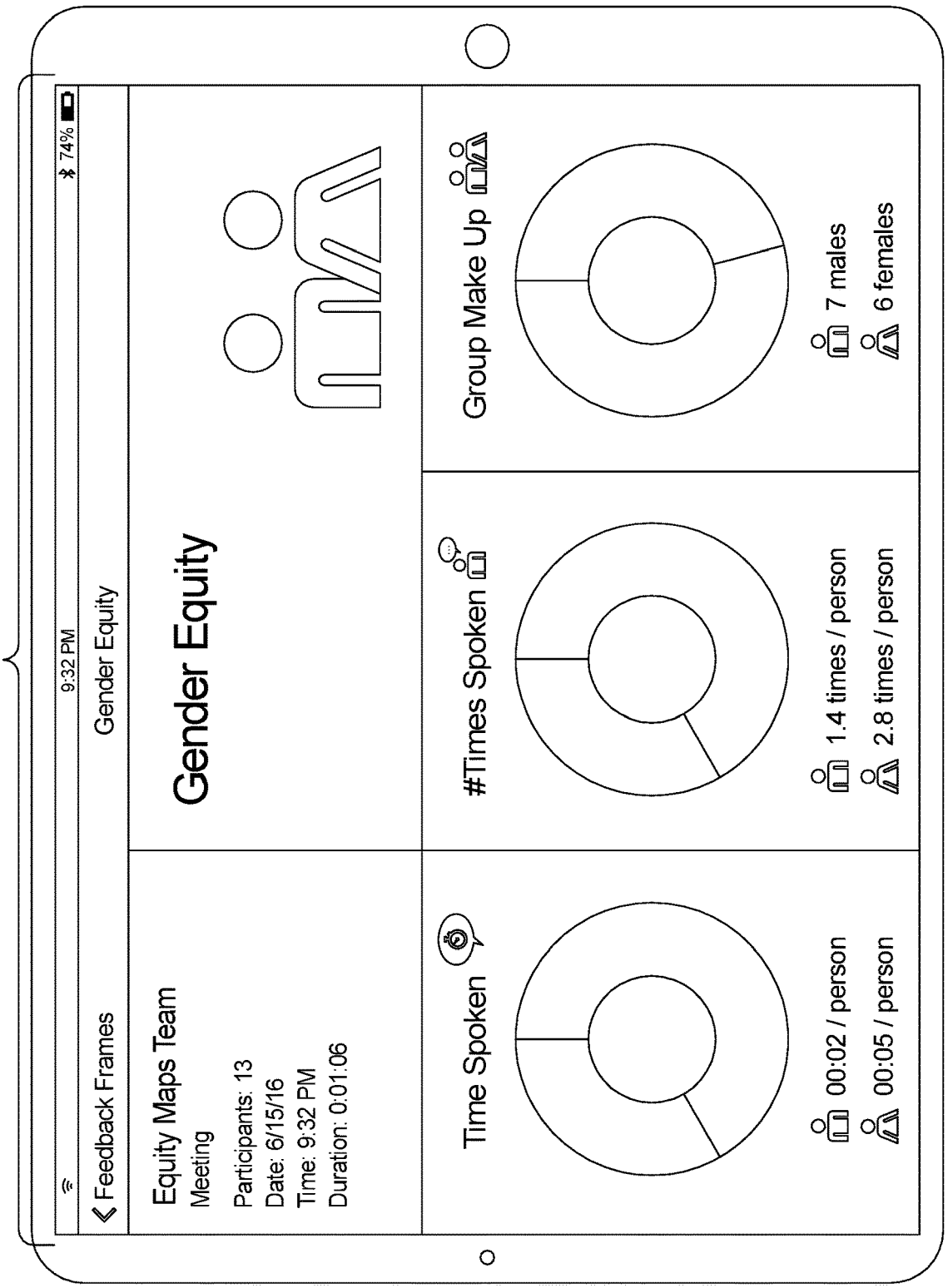
FIG. 22 is depicts a schematic of a user interface illustrating data relating to the gender equity in the group discussion, including a comparison of how often and how long females and males spoke.
Figure 23:
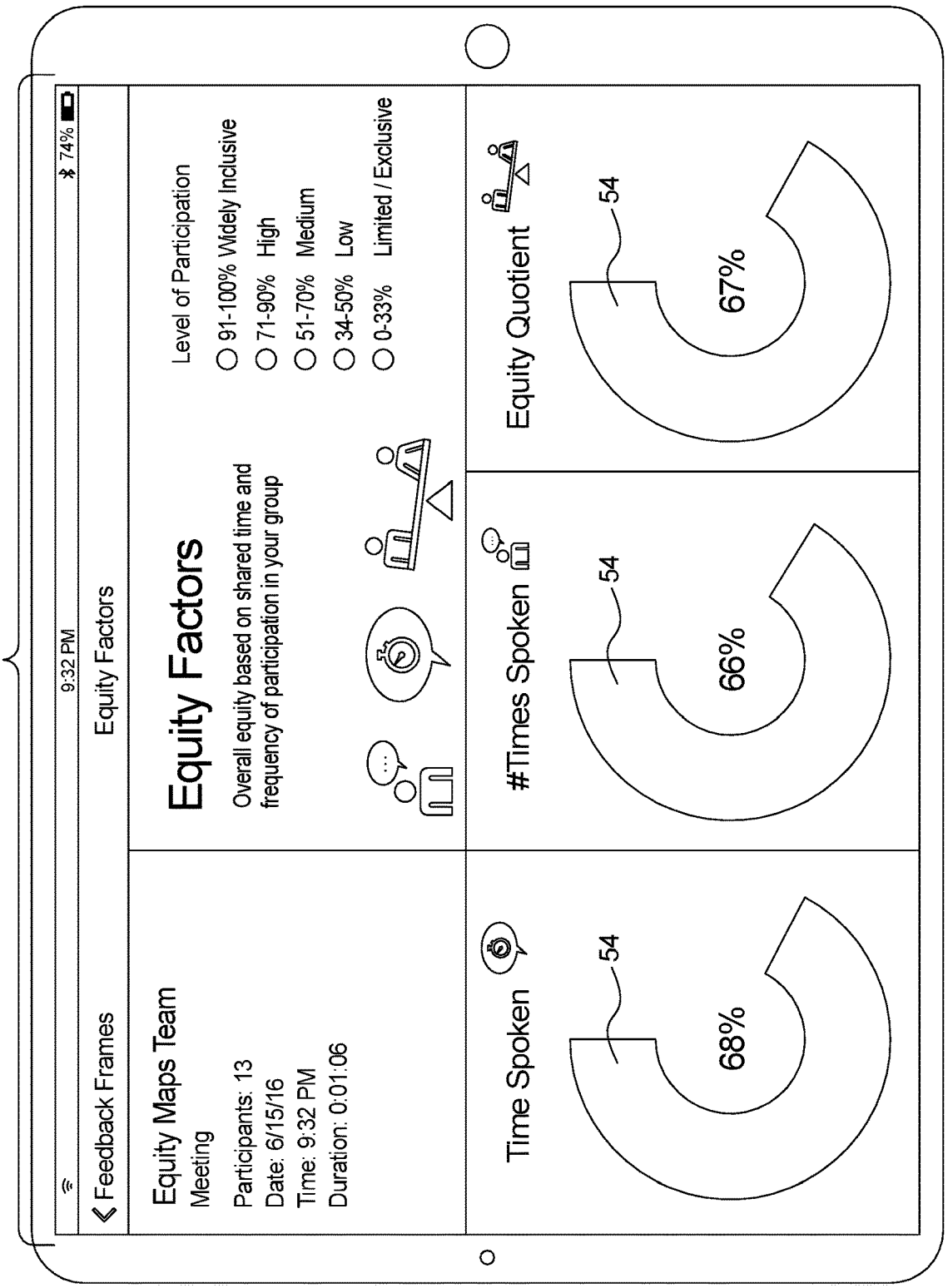
FIG. 23 is depicts a schematic of a user interface illustrating the degree of equity in the conversation.

The results summary can be configured to summarize any number of metrics. For example, FIG. 22 is a schematic of a user interface illustrating data relating to the gender equity in the group discussion, including a comparison of how often and how long females and males spoke. In another example, FIG. 23 depicts a schematic of a user interface illustrating the degree of equity in the recorded conversation. For example, equity in time spoken (e.g., seconds, minutes, hours), number of times spoken, and equity quotient can be represented in various visual graphics, such as partial pie graphs 54.

By selecting the playback option, the user may be directed to the original diagram of the group, where the playback will initiate and redraw the lines between participants in coordination with the conversation. The playback may feature additional graphics to illustrate who is talking, including highlighting the participant icon who is speaking or displaying another menu showing each new speaker along with the time they spoke in each instance. The playback may occur at the same speed as the conversation or the user may speed it up and slow it down. The user may also have the option to pause the discussion.

Figure 24:
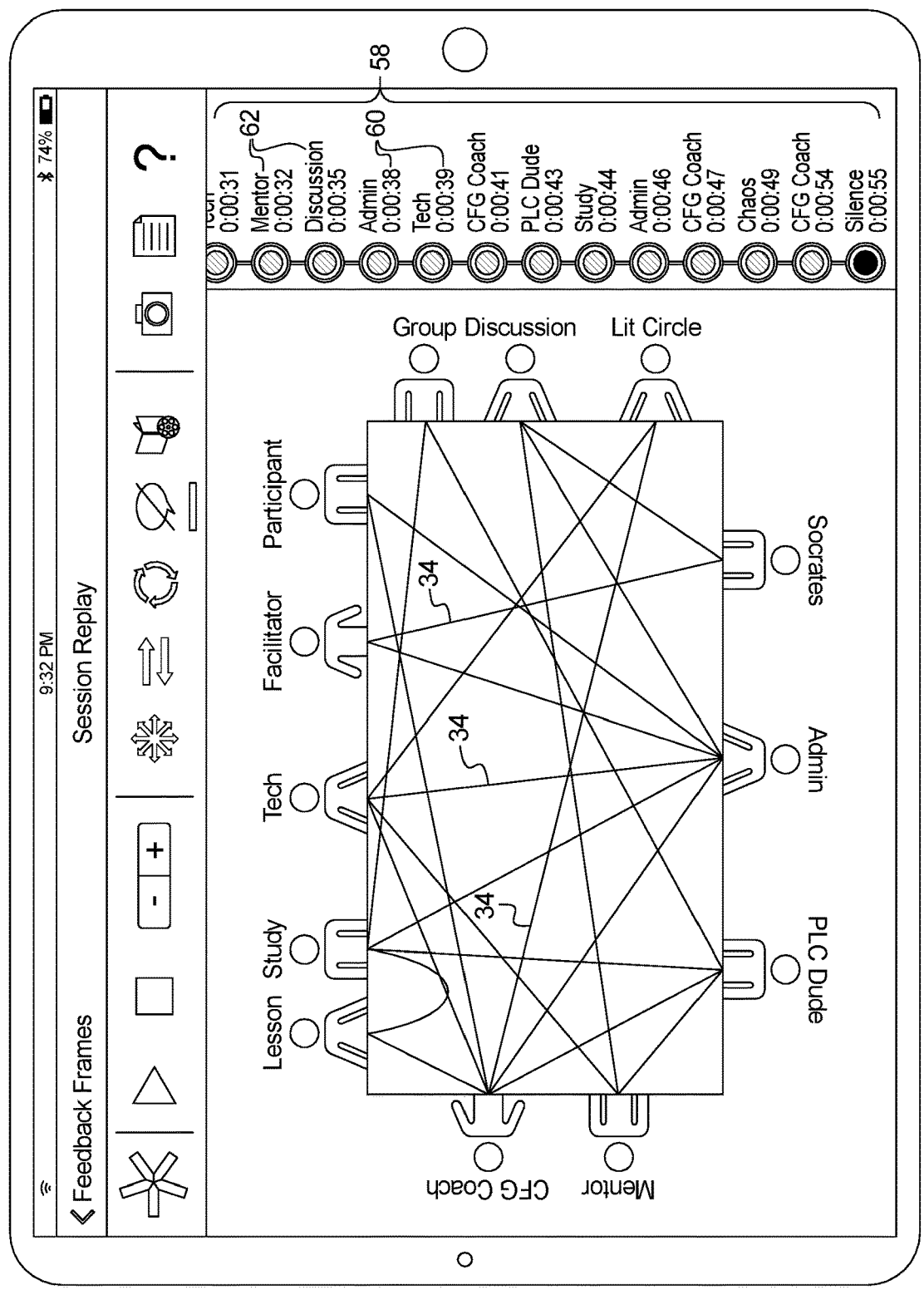
FIG. 24 depicts a schematic of a user interface illustrating the playback screen for the discussion. It includes commands for initiating, stopping, fast-forwarding and rewinding the playback. The play back plays with connected lines over the seating configuration and with a string of highlighted circles on the right side of the screen.

FIG. 24 depicts a schematic of a user interface illustrating the playback screen for the discussion. The playback menu includes commands for initiating, stopping, fast-forwarding and rewinding the playback. The play back plays with connected lines 34 over the seating configuration and with a string of highlighted circles on the right side of the screen indicating the timeline of the conversation 58. The circles can indicate specific time points that may or may not be equally spaced in time. The timeline 58 can include various annotations indicating the speaker (e.g., specific participant, mentor, facilitator, etc.) and a time reference 60. Further, during playback, a user can select a certain circle and the conversation can immediately play the discussion occurring at the reference time point associated with the circle.

In an example, during the playback, certain lines 34 can be appear in order while a speaker is speaking to indicate who is speaking and who the speaker is addressing. Alternatively, the plurality of lines may appear at once but certain lines can be highlighted during play back to illustrate which participant is speaking and to whom.

Figure 25:
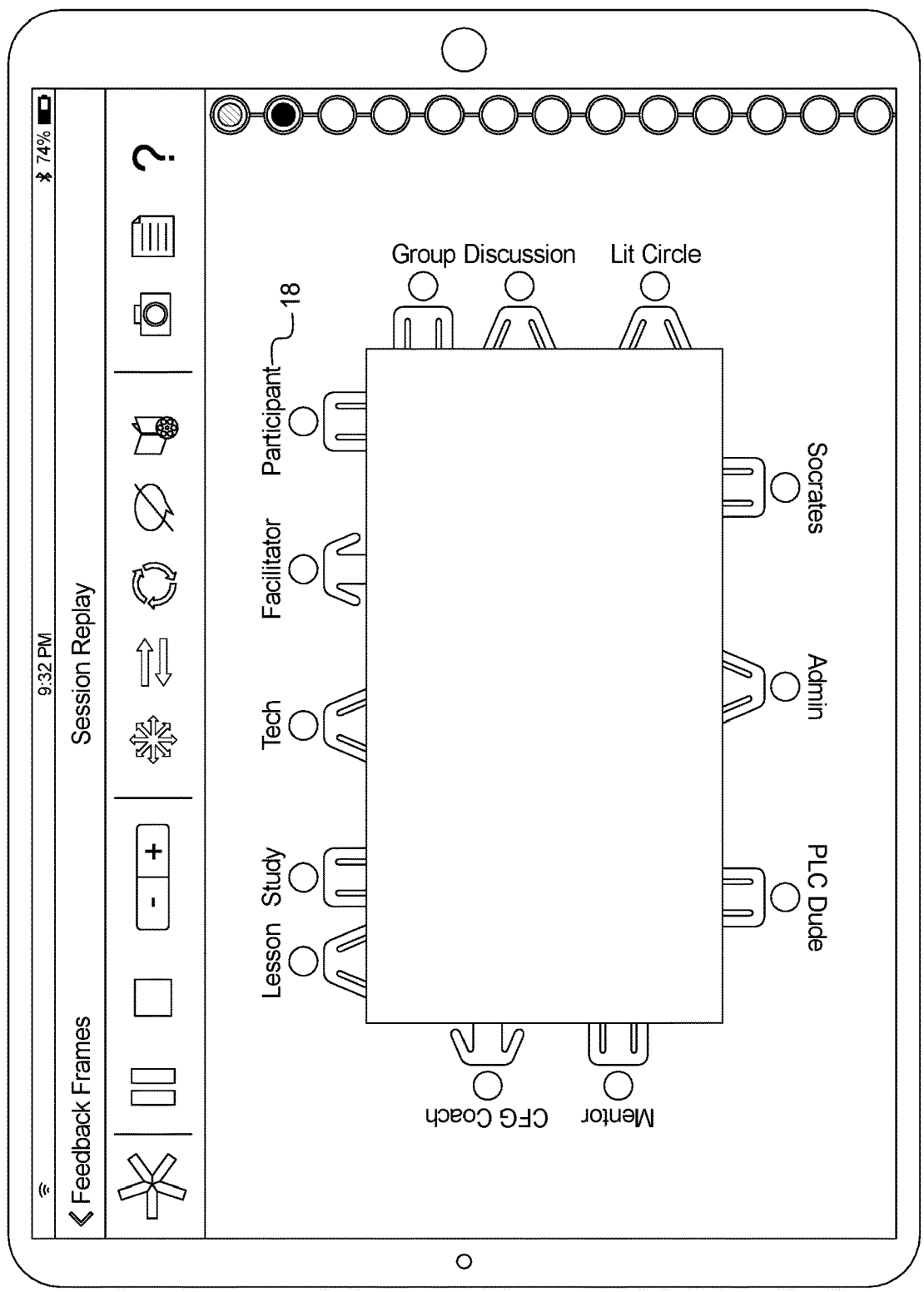
FIG. 25 depicts a schematic of a user interface illustrating the beginning of the playback. The table display has no lines and the string of circles has the second circle highlighted. This screen includes a "pause" command for pausing the playback.
Figure 26:
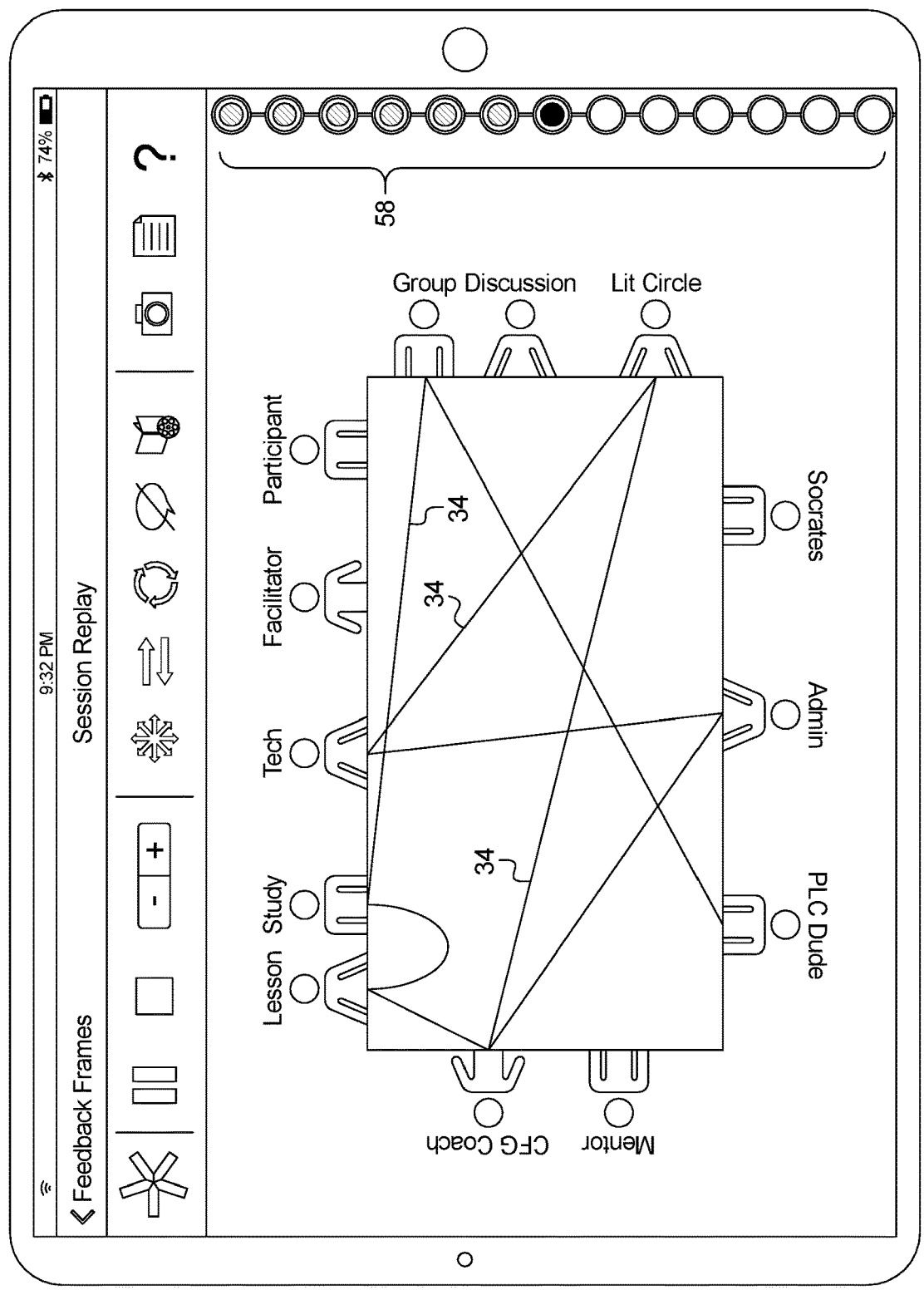
FIG. 26 depicts a schematic of a user interface illustrating the playback from mid-way through the discussion
Figure 27:
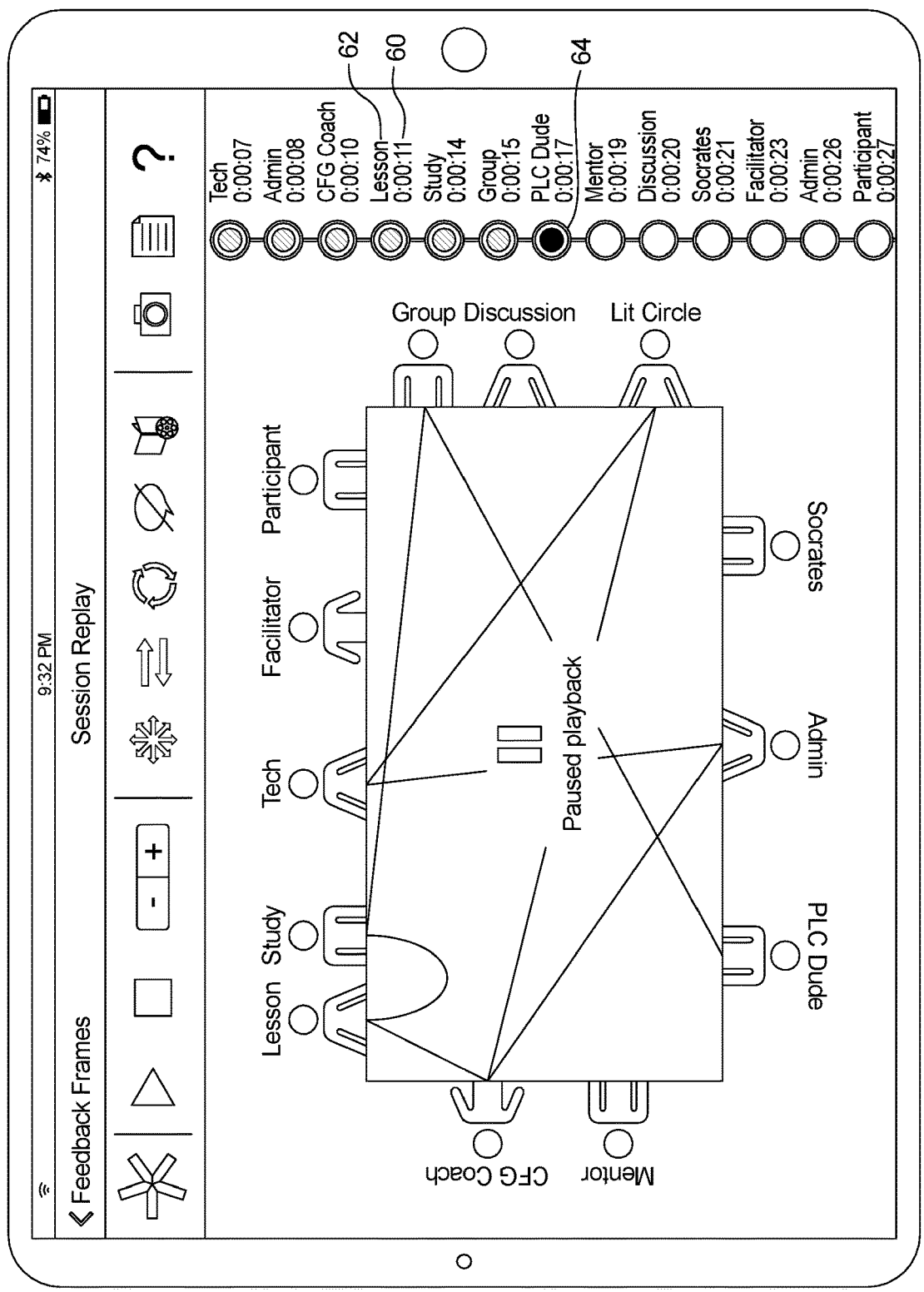
FIG. 27 depicts a schematic of a user interface illustrating the playback paused, with the string of circles in the right of the screen accompanied by the name of the speaker that each circle represents and the time they spoke in the conversation.

For example, FIG. 25 depicts a schematic of a user interface illustrating the beginning of the playback. The table in the seating arrangement display has no lines and the string of circles has the second circle highlighted. This screen includes a "pause" command for pausing the playback. FIG. 26 depicts a schematic of a user interface illustrating the playback from mid-way through the discussion. FIG. 27 depicts a schematic of a user interface illustrating the playback paused, with the string of circles in the right of the screen accompanied by the name of the speaker that each circle represents and the time they spoke in the conversation.

As shown in FIG. 27, as time progresses, the lines 34 begin to appear indicating the speaker and audience for the specific time (i.e., each note, text, or comment is time stamped). In addition, the timeline 58 can also fill or populate as time passes in the replay indicating the speaker or item 62 and time reference 60. The present time location 64 of the replay of the discussion can be indicated by highlighting the circle corresponding to the present time reference 60 in the timeline 58.

The system can include a menu displaying each participant speaker that may be used to play isolated clips from the discussion. Alternatively, or in addition to, the user can select a participant icon and a menu can appear. In an example, the menu can include a list of isolated clips each for each time the selected participant spoke. For example, if the user wanted to hear what one participant said the first time they spoke, the user could select that user's icon in the menu and hear that clip.

The system may include another version of the software application where participants may view playbacks and analytics from the discussions they participated in. The software may also provide for communication between users, allowing them to share discussions with one another.

Figure 28:
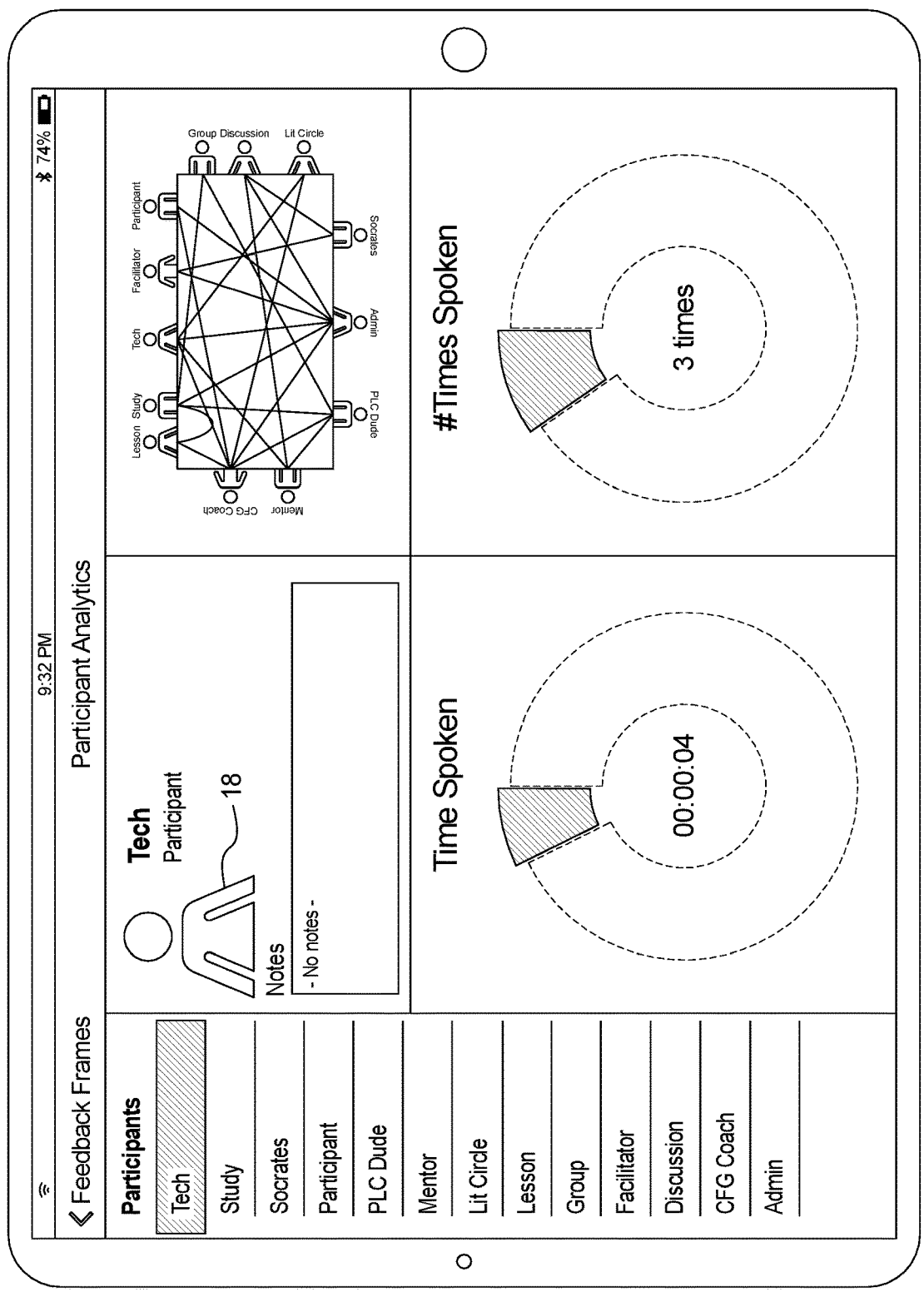
FIG. 28 depicts a schematic of a user interface illustrating data for a single group participant. A menu in the left of the screen allows the user to view the data for other participants. The screen includes a field for taking notes about the participant.

In yet another example, FIG. 28 depicts a schematic of a user interface illustrating data for a single group participant 18. A menu in the left of the screen allows the user to view the data for other participants. The screen includes a field for taking notes about the participant 18.

In addition, the system can provide visual group analytics, wherein a discussion of a group of participants can be compared to the same group of participants participating in a previously recorded discussion. Alternatively, or in addition to, the discussion of a group of participants can be compared to various other groups of different (or partially different) groups of participants in previously recorded discussions.

Figure 29:
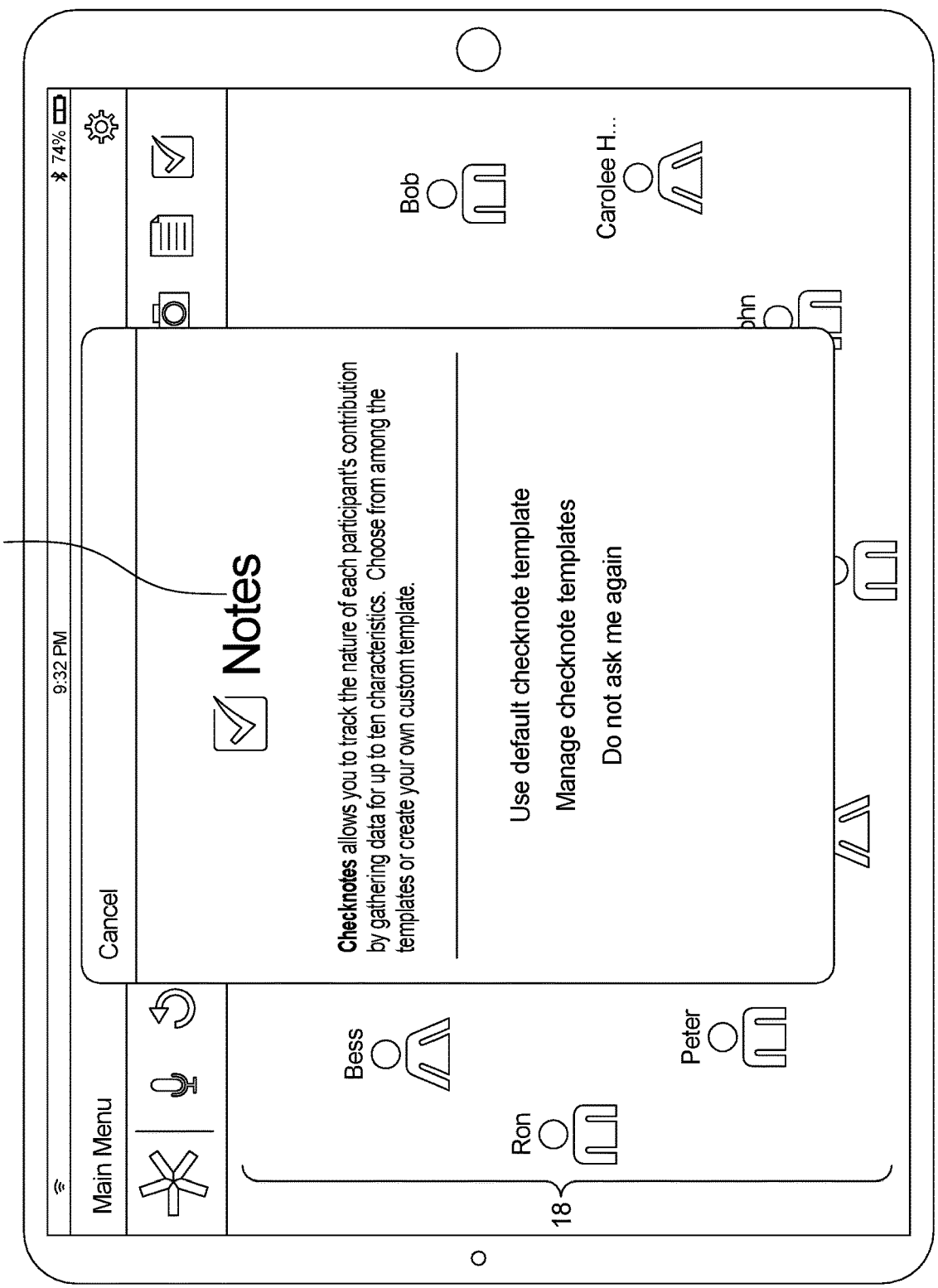
FIG. 29 depicts a schematic of a user interface illustrating the option of a checknote program activated by the user.

As shown in FIG. 29, the system can also include access to a checknote 40. For example, when the check note selection 44 is selected (i.e., "turned on") the user will be able to enter notes for a selected participant, by entering either textual notes and/or characteristics 42.

Figure 31:
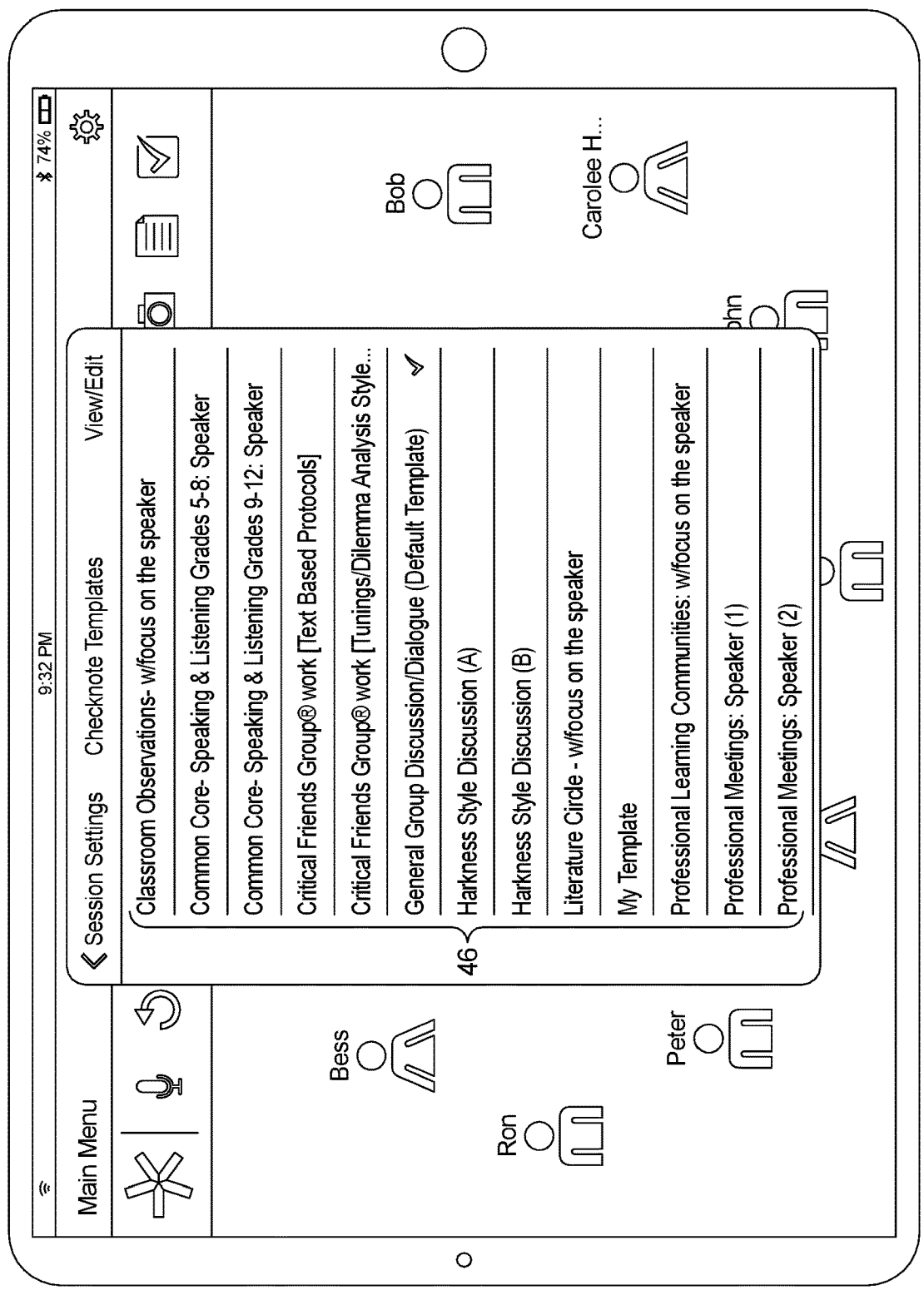
FIG. 31 depicts a schematic of a user interface illustrating various existing templates for checknotes.

For example, prior to the start of the recorded discussion (e.g., class, meeting, etc.), the user can select from among various checknote templates stored in the system. For example, as shown in FIG. 31, the template can be chosen from a number of preexisting templates including, but not limited to, classroom observations with focus on the speaker, common core speaking and listening for grades 5-8, common core speaking and listening for grades 9-12, critical friend groups for work including text based protocols, critical friends groups for work with tunings and dilemma analysis, general group discussion, harkness style discussion, literature circles, professional meetings, among others. Alternatively, or in addition to, the templates 46 can be customized by creating a new template or editing existing templates by the user. In an example, the templates can include a number of characteristics of the nature of the speaker's contributions.

Figure 30A:
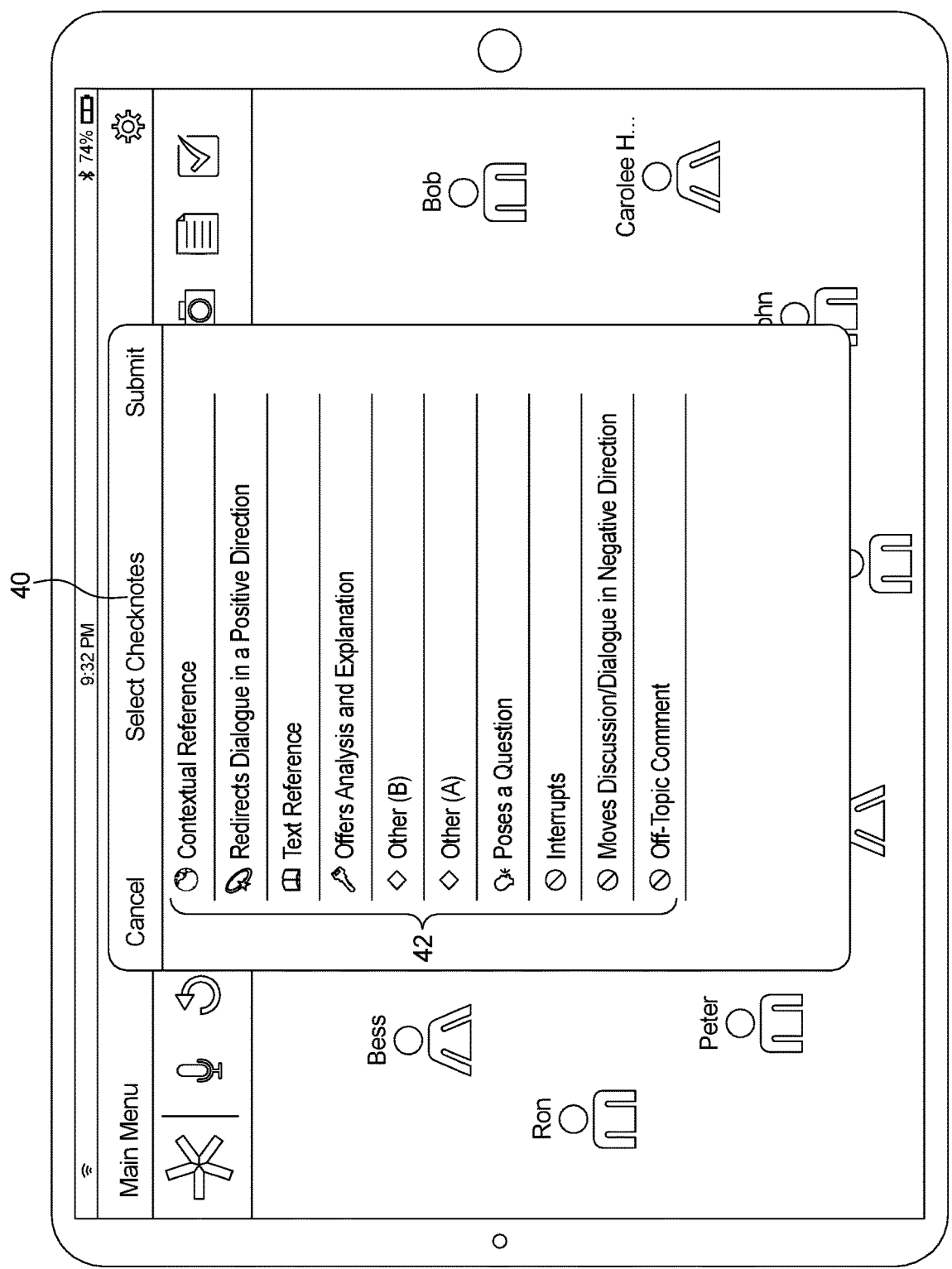
FIGS. 30A-30B depict schematics of a user interface illustrating various evaluation characteristics.
Figure 30B:
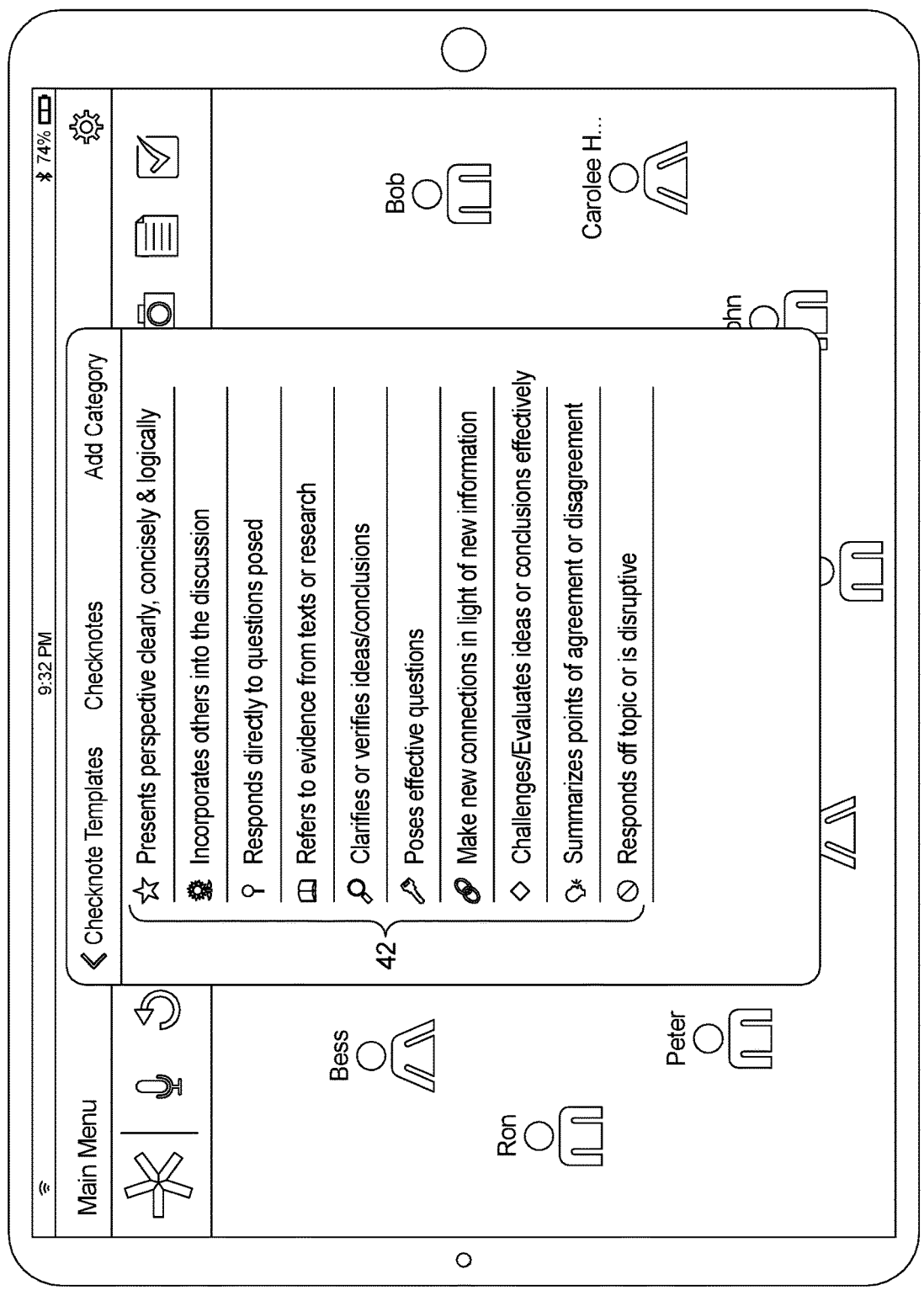

For example, as shown in FIGS. 30A-30B, the characteristics can include an evaluation of the participant's participation or comment, such as, redirecting dialogue in a positive direction, makes a textual reference, makes a contextual reference, offers analysis, offers explanation, poses a question, interrupts others, moves discussion in a negative direction, and/or makes an off-topic comment. The evaluation characteristics 42 can be stored according to each participant and recalled by the system. As shown in FIGS. 30A-30B, the user can mark (i.e., check) one or more of the appropriate characteristics. In FIG. 30A, the "redirects dialogue in a positive direction" is checked.

Figure 32:
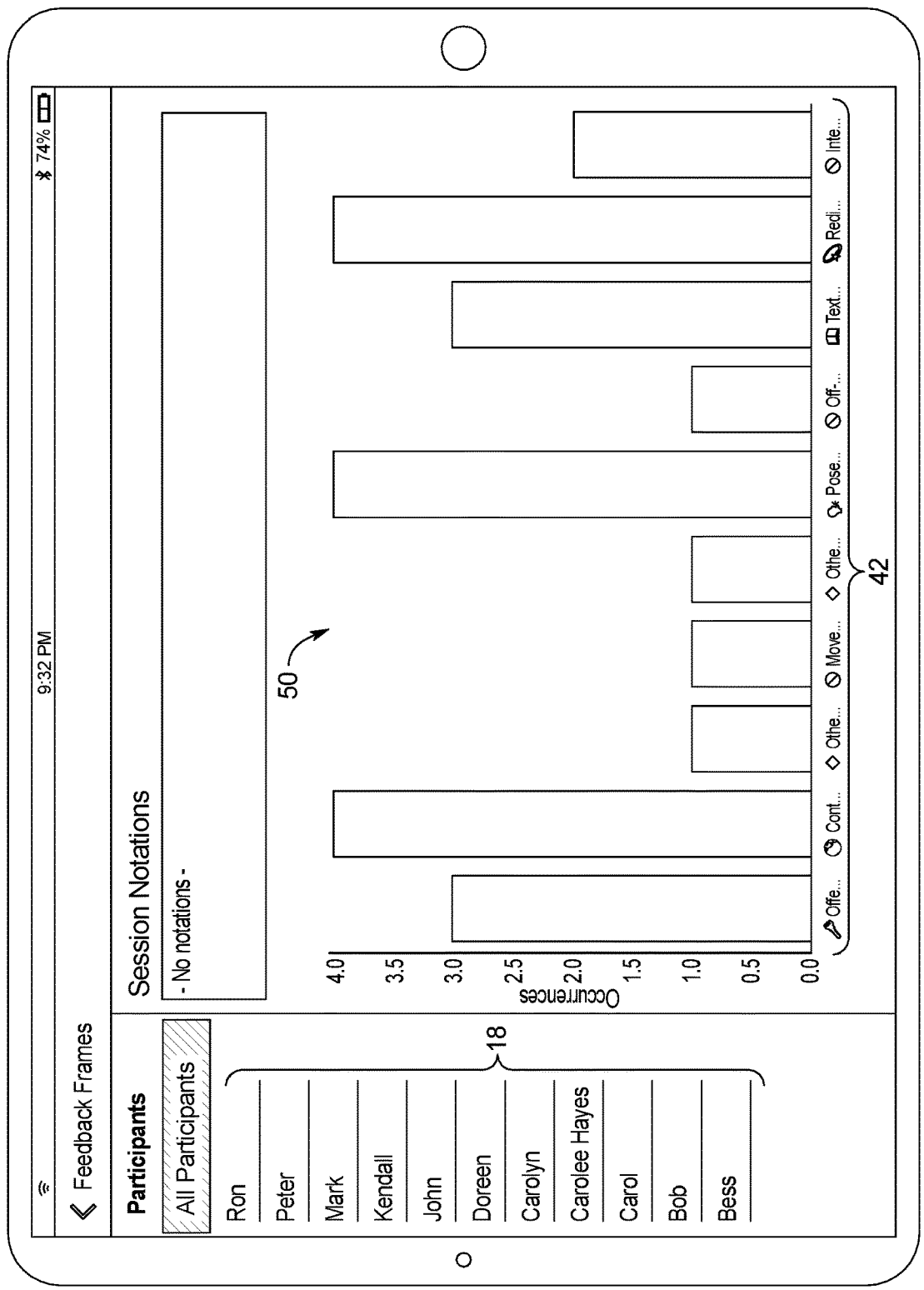
FIG. 32 depicts a schematic of a user interface illustrating a summary graphic illustrating the results of the characteristics selected by the user pertaining to the participants.
Figure 33:
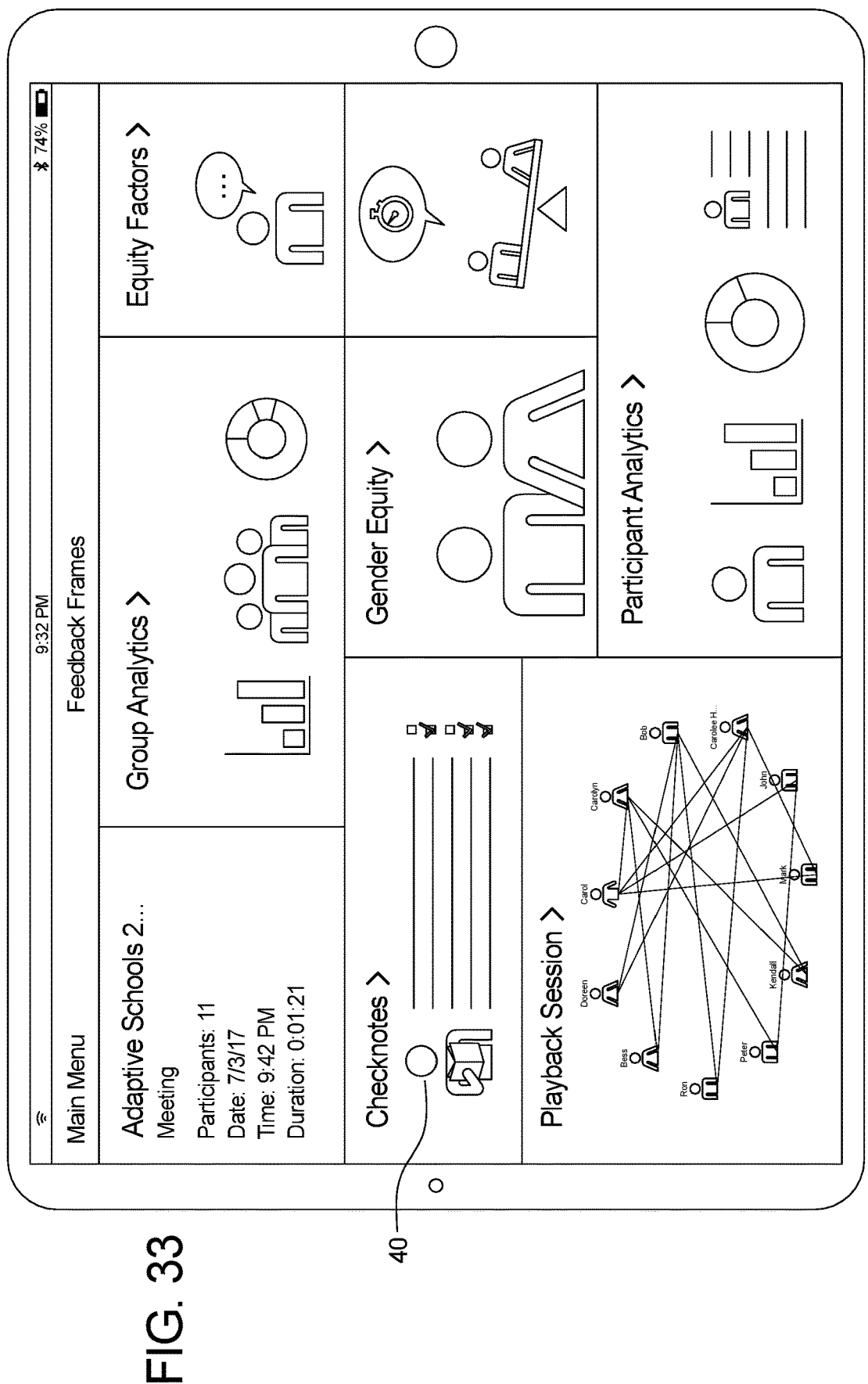
FIG. 33 depicts a schematic of a user interface illustrating a summary of results for a discussion including the checknote results.

As shown in FIG. 32, the session notations can be analyzed and presented as a graphic 50, such as a bar or pie graph, wherein each characteristic 42 can be plotted for all of the participants or individual participants 18. As shown in FIG. 33, the summary result page can include the checknotes 40, wherein if the user selects the checknotes 40, the user will be directed to, for example, the display in FIG. 32.

As mentioned above, aspects of the systems and methods described herein are controlled by one or more controllers. The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A system for visually representing an audio discussion session having a plurality of participants, the system comprising:
    a controller;
    a memory coupled to the controller, wherein the memory is configured to store program instructions executable by the controller;
    wherein in response to executing the program instructions, the controller is configured to:
        record an audio discussion among a plurality of participants, wherein each participant is visually represented by a participant icon;
        while recording, upon a first participant speaking, receive a first participant icon speaker selection, wherein the first participant icon speaker is selected from the plurality of participants, wherein the first participant icon speaker is associated with a first participant icon;
        upon completion of the first participant speaking, receive a subsequent second participant icon speaker selection upon the commencement of the second participant speaking, wherein the second participant icon speaker is associated with a second participant icon; and wherein upon playback, display a visual presentation of the audio discussion, wherein the visual presentation includes displaying each participant icon, wherein the visual presentation includes displaying a line connecting the first participant icon to the second participant icon after completion of the first participant speaking and commencement of the second participant speaking.

2. The system of claim 1, wherein the visual presentation includes a timeline representing the time duration of the audio discussion, wherein the timeline includes a plurality of visual time reference points, wherein during playback, the visual presentation highlights the time reference point matching the replay time.

3. The system of claim 2, wherein the visual time reference point includes a recorded time reference and an identification of the participant speaking at that recorded time reference.

4. The system of claim 1, wherein, during recording, the controller is further configured to receive text corresponding to at least one time reference point, wherein upon playback, the controller is configured to display the text corresponding to the time reference point at the time during playback corresponding to the time reference point.

5. The system of claim 1, wherein the controller is further configured to
receive a seating configuration selection, and
receive a position for the participant icon in the seating configuration for each of the plurality of participants.

6. The system of claim 5, wherein the seating configuration is selected from a classroom configuration, a boardroom meeting configuration, and a roundtable configuration.

7. The system of claim 1, wherein the controller is further configured to receive an evaluation characteristic from the user for at least one participant, wherein the results summary includes a graphic visually representing the evaluation characteristics of the at least one participant.

8. The system of claim 1, wherein the visual presentation includes a plurality of lines connecting the participant icons, wherein upon playback, the line connecting the first participant icon to the second participant icon is highlighted at the time corresponding to the ending of the first participant icon speaker speaking and the beginning of the second participant icon speaker speaking.

9. The system of claim 1, wherein the controller is further configured to, upon completion of the discussion, determine the length of time and number of times each participant spoke during the discussion; and
display a results summary including a graphic visually representing the participation of each of the plurality of participants in the recorded discussion, wherein the graphic includes a pie graph, a bar graph, a line graph, and combinations thereof.

10. The system of claim 9, wherein the controller is further configured to receive demographic information related to each of the plurality of participants, wherein the results summary includes a graphic visually representing the participation of a group of participants within a demographic.

11. The system of claim 9, wherein, during recording, the controller is further configured to receive text corresponding to at least one time reference point, wherein the results summary includes a timeline representing the entire time duration of the audio discussion, wherein the timeline includes a plurality of visual time reference points, wherein upon selection of a time reference point, visually display any text corresponding to the time reference point.

12. The system of claim 1, wherein the controller is further configured to receive a participant selection from the visual presentation, wherein upon receipt of the participant selection, visually indicate a relative portion of a results summary graphic, wherein the relative portion represents at least one of the total length of time the selected participant spoke in the audio discussion, the number of times the selected participant spoke in the audio discussion, the number of evaluation characteristics, or combinations thereof, compared to the unselected participants.

13. The system of claim 1, wherein the controller is further configured to produce a score for each of the plurality of participants based on at least one of the total length of time the selected participant spoke in the discussion, the number of times the selected participant spoke in the discussion, a number of evaluation characteristics, or combinations thereof.

14. The system of claim 1, wherein the controller is further configured to, upon receipt of a selected participant, provide a menu of isolated audio clips corresponding to each time the selected participant spoke during the recorded discussion.

* * * * *